United States Patent
Chen et al.

(10) Patent No.: US 9,894,663 B2
(45) Date of Patent: Feb. 13, 2018

(54) SYSTEMS AND METHODS FOR IMPROVED COMMUNICATION EFFICIENCY IN WIRELESS NETWORKS

(71) Applicant: QUALCOMM Incorporated, San Diego, CA (US)

(72) Inventors: Jialing Li Chen, San Diego, CA (US); Lin Yang, San Diego, CA (US); Bin Tian, San Diego, CA (US); Sameer Vermani, San Diego, CA (US); Rahul Tandra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 14/805,347

(22) Filed: Jul. 21, 2015

(65) Prior Publication Data

US 2016/0029397 A1     Jan. 28, 2016

Related U.S. Application Data

(60) Provisional application No. 62/028,177, filed on Jul. 23, 2014, provisional application No. 62/033,350, (Continued)

(51) Int. Cl.
*H04W 4/00* (2009.01)
*H04W 72/08* (2009.01)
(Continued)

(52) U.S. Cl.
CPC ......... *H04W 72/082* (2013.01); *H04L 1/0057* (2013.01); *H04L 5/0007* (2013.01);
(Continued)

(58) Field of Classification Search
CPC combination set(s) only.
See application file for complete search history.

(56) References Cited

U.S. PATENT DOCUMENTS

| 8,345,534 B1 * | 1/2013 | Narasimhan ......... H04B 7/0447 370/208 |
| 8,638,761 B2 * | 1/2014 | Taghavi Nasrabadi ............ H04L 1/0606 370/335 |

(Continued)

OTHER PUBLICATIONS

Wang, LDPC Tone Mapping for IEEE 802.11aj (45GHz), IEEE, 30 pages, Jul. 2014.*

(Continued)

*Primary Examiner* — Frank Duong
(74) *Attorney, Agent, or Firm* — Knobbe, Martens, Olson & Bear LLP

(57) ABSTRACT

Methods and apparatuses for providing wireless messages according to various tone plans can include a system including a memory that stores instructions. The system further includes a processor coupled with the memory. The processor is configured to execute the instructions to generate a message for wireless communication according to at least one of a set of 52 tones, for allocation to an individual device, including 48 data tones and 4 pilot tones, and a set of 106 tones, for allocation to an individual device, including 102 data tones and 4 pilot tones. The processor is further configured to execute the instructions to provide the message for transmission.

27 Claims, 20 Drawing Sheets

Related U.S. Application Data filed on Aug. 5, 2014, provisional application No. 62/039,784, filed on Aug. 20, 2014, provisional application No. 62/064,301, filed on Oct. 15, 2014.

(51) Int. Cl.
  *H04L 1/00* (2006.01)
  *H04L 5/00* (2006.01)
  *H04W 72/04* (2009.01)

(52) U.S. Cl.
  CPC .......... *H04L 5/0023* (2013.01); *H04L 5/0026* (2013.01); *H04L 5/0041* (2013.01); *H04L 5/0044* (2013.01); *H04L 5/0048* (2013.01); *H04W 72/042* (2013.01); *H04W 72/0413* (2013.01); *H04W 72/0486* (2013.01)

(56) References Cited

U.S. PATENT DOCUMENTS

| | | | |
|---|---|---|---|
| 8,724,720 B2 | 5/2014 | Srinivasa et al. | |
| 2012/0087426 A1 | 4/2012 | Zhang et al. | |
| 2012/0294247 A1 | 11/2012 | Choi et al. | |
| 2012/0327868 A1* | 12/2012 | Taghavi Nasrabadi | H04L 1/0606 370/329 |
| 2013/0121243 A1 | 5/2013 | Vermani et al. | |
| 2013/0177115 A1* | 7/2013 | Yang | H04L 25/0202 375/347 |
| 2013/0179755 A1* | 7/2013 | Yang | H03M 13/13 714/776 |
| 2013/0208821 A1* | 8/2013 | Yang | H04L 1/0071 375/295 |
| 2013/0315323 A1 | 11/2013 | Porat | |
| 2014/0016571 A1* | 1/2014 | Yucek | H04L 1/0071 370/329 |
| 2015/0063255 A1* | 3/2015 | Tandra | H04J 11/0023 370/329 |
| 2015/0280953 A1 | 10/2015 | Porat et al. | |
| 2015/0288489 A1 | 10/2015 | Azizi et al. | |
| 2015/0326351 A1 | 11/2015 | Kim et al. | |
| 2015/0349995 A1* | 12/2015 | Zhang | H04L 5/0048 375/295 |
| 2015/0365195 A1* | 12/2015 | Yang | H04L 27/2634 375/295 |
| 2016/0007354 A1* | 1/2016 | Chen | H04L 5/0044 370/329 |
| 2016/0021667 A1 | 1/2016 | Kwon et al. | |
| 2016/0044675 A1* | 2/2016 | Chen | H03M 13/1102 370/329 |
| 2016/0080043 A1 | 3/2016 | Tian et al. | |
| 2016/0241369 A1* | 8/2016 | Yang | H04L 5/0048 |
| 2016/0353370 A1 | 12/2016 | Choi et al. | |

OTHER PUBLICATIONS

IEEE Standards Association: "Part 11: Wireless LAN Medium Access Control (MAC) and Physical Layer (PHY) Specifications, Amendment 4: Enhancements for Very High Throughput for Operation in Bands below 6 GHz" Dec. 11, 2013 (Dec. 11, 2013), XP002745074, Retrieved from the Internet: URL:http://ieeexplore.ieee.org/stamp/stamp.jsp?tp=&arnumber=6687187.

International Search Report and Written Opinion—PCT/US2015/041534—ISA/EPO—Oct. 7, 2015.

Zheng, J., "LDPC for 11ac", IEEE Standards, Nov. 8, 2010, pp. Slide 1-Slide 39, XP002694969, Piscataway, NJ, USA.

* cited by examiner

| FFT Size | Minimum # DC tones | Minimum # guard tones | Minimum # pilot tones | Upper bound of $N_{data}$ |
|---|---|---|---|---|
| 64 | 1 | 7 | 4 | $N_{data} <= 64-1-7-4=52$ |
| | 5 | 7 | 4 | $N_{data} <= 64-5-7-4=48$ |
| | 7 | 7 | 4 | $N_{data} <= 64-7-7-4=46$ |
| 128 | 3 | 11 | 6 | $N_{data} <= 128-3-11-6=108$ |
| | 5 | 11 | 6 | $N_{data} <= 128-5-11-6=106$ |
| | 7 | 11 | 6 | $N_{data} <= 128-7-11-6=104$ |
| 256 | 3 | 11 | 8 | $N_{data} <= 256-3-11-8=234$ |
| | 5 | 11 | 8 | $N_{data} <= 256-5-11-8=232$ |
| | 7 | 11 | 8 | $N_{data} <= 256-7-11-8=230$ |
| 512 | 5 | 11 | 12 | $N_{data} <= 512-5-11-12=484$ |
| | 11 | 11 | 12 | $N_{data} <= 512-11-11-12=478$ |
| 1024 | 5 | 11 | 12 | $N_{data} <= 1024-5-11-12=996$ |
| | 11 | 11 | 12 | $N_{data} <= 1024-11-11-12=990$ |

FIG. 4

| Feasible # $N_{data}$ for 64FFT | 38 | 40 | 42 | 44 | 46 | 48 |
|---|---|---|---|---|---|---|
| Gain over 48 | -20.83% | -16.67% | -12.5% | -8.33% | -4.17% | 0 |
| Gain over 52 | -26.92% | -23.08% | -19.23% | -15.38% | -11.54% | -7.69% |
| Maximum # pilot tones if minimum # DC tones = 1 | 18 | 16 | 14 | 12 | 10 | 8 |
| Maximum # pilot tones if minimum # DC tones = 5 | 14 | 12 | 10 | 8 | 6 | 4 |
| Maximum # pilot tones if minimum # DC tones = 7 | 12 | 10 | 8 | 6 | 4 | Not allowed |

FIG. 5

| Feasible # $N_{data}$ for 128FFT | 96 | 98 | 100 | 102 | 104 | 106 |
|---|---|---|---|---|---|---|
| Gain over 108 | -11.11% | -9.26% | -7.41% | -5.56% | -3.70% | -1.85% |
| Maximum # pilot tones if minimum # DC tones = 3 | 18 | 16 | 14 | 12 | 10 | 8 |
| Maximum # pilot tones if minimum # DC tones = 5 | 16 | 14 | 12 | 10 | 8 | 6 |
| Maximum # pilot tones if minimum # DC tones = 7 | 14 | 12 | 10 | 8 | 6 | Not allowed |

FIG. 6

| Feasible # $N_{data}$ for 256FFT | 216 | 218 | 220 | 222 | 224 | 225 | 226 | 228 | 230 | 232 |
|---|---|---|---|---|---|---|---|---|---|---|
| Gain over 234 | -7.69% | -6.84% | -5.98% | -5.13% | -4.27% | -3.85% | -3.42% | -2.56% | -1.71% | -0.85% |
| Maximum # pilot tones if minimum # DC tones = 3 | 26 | 24 | 22 | 20 | 18 | 17 | 16 | 14 | 12 | 10 |
| Maximum # pilot tones if minimum # DC tones = 5 | 24 | 22 | 20 | 18 | 16 | 15 | 14 | 12 | 10 | 8 |
| Maximum # pilot tones if minimum # DC tones = 7 | 22 | 20 | 18 | 16 | 14 | 13 | 12 | 10 | 8 | Not allowed |

FIG. 7

| Feasible # $N_{data}$ for 512FFT | 474 | 476 | 480 |
|---|---|---|---|
| Gain over 468 | 1.28% | 1.71% | 2.56% |
| Maximum # pilot tones if minimum # DC tones = 5 | 22 | 20 | 16 |
| Maximum # pilot tones if minimum # DC tones = 11 | 16 | 14 | Not allowed |

FIG. 8

| Feasible # $N_{data}$ for 1024FFT | 948 | 960 | 972 | 980 | 984 | 990 | 996 |
|---|---|---|---|---|---|---|---|
| Gain over 936 | 1.28% | 2.56% | 4.06% | 4.70% | 5.13% | 5.77% | 6.41% |
| Maximum # pilot tones if minimum # DC tones = 5 | 60 | 48 | 36 | 28 | 24 | 18 | 12 |
| Maximum # pilot tones if minimum # DC tones = 11 | 54 | 42 | 30 | 22 | 18 | 12 | Not allowed |

FIG. 9

| $N_{data}$ | $N_{COL}$ Candidates | $N_{ROW}$ $N_{data}/N_{COL}$ | $N_{ROT}$ Candidates ($N_{ss}<=4$) | $N_{ROT}$ Candidates ($N_{ss}>4$) | Stream Permutation ($N_{ss}<=4$) | Stream Permutation ($N_{ss}>4$) |
|---|---|---|---|---|---|---|
| 38 | 2,19 | | 1, 2, 3, 4, 5, 6, 7, 8, 9, 10, 11, 12, 13, 14, 15,16 | 1, 2, 3, 4, 5, 6, 7, 8, 9, 10 | Bit reversal [0 2 1 3] | Choice 1: Bit reversal [0 4 2 6 1 5 3 7] Choice 2: Permutation chosen to maximize average subcarrier distance of adjacent streams, e.g., [0 5 2 7 3 6 1 4] |
| 40 | 2,4,5,8,10,20 | | | | | |
| 42 | 2,3,6,7,14,21 | | | | | |
| 44 | 2,4,11,22 | | | | | |
| 46 | 2,23 | | | | | |
| 48 | 2,3,4,6,8,12,16,24 | | | | | |

FIG. 12

| $N_{data}$ | $N_{COL}$ Candidates | $N_{ROW}$ $N_{data}/N_{COL}$ | $N_{ROT}$ Candidates ($N_{ss}<=4$) | $N_{ROT}$ Candidates ($N_{ss}>4$) | Stream Permutation ($N_{ss}<=4$) | Stream Permutation ($N_{ss}>4$) |
|---|---|---|---|---|---|---|
| 96 | 2,3,4,6,8,12,16,24,32,48 | | 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31 | 1, 2, 3, 4, 5, 6, 7, 8, 9, 10, 11, 12, 13, 14, 15, 16, 17, 18 | Bit reversal [0 2 1 3] | Choice 1: Bit reversal [0 4 2 6 1 5 3 7] Choice 2: Permutation chosen to maximize average subcarrier distance of adjacent streams, e.g., [0 5 2 7 3 6 1 4] |
| 98 | 2,7,14,49 | | | | | |
| 100 | 2,4,5,10,20,25,50 | | | | | |
| 102 | 2,3,6,17,34,51 | | | | | |
| 104 | 2,4,8,13,26,52 | | | | | |
| 106 | 2,53 | | | | | |

FIG. 13

| $N_{data}$ | $N_{COL}$ Candidates | $N_{ROW}$ $N_{data}/N_{COL}$ | $N_{ROT}$ Candidates ($N_{ss}<=4$) | $N_{ROT}$ Candidates ($N_{ss}>4$) | Stream Permutation ($N_{ss}<=4$) | Stream Permutation ($N_{ss}>4$) |
|---|---|---|---|---|---|---|
| 216 | 2,3,4,6,8,9,12,18,24,27,36,54,72,108 | | 50, 51, 52, 53, 54, 55, 56, 57, 58, 59, 60, 61, 62 | 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33 | Bit reversal [0 2 1 3] | Choice 1: Bit reversal [0 4 2 6 1 5 3 7] Choice 2: Permutation chosen to maximize average subcarrier distance of adjacent streams, e.g., [0 5 2 7 3 6 1 4] |
| 218 | 2,109 | | | | | |
| 220 | 2,4,5,10,11,20,22,44,55,110 | | | | | |
| 222 | 2,3,6,37,74,111 | | | | | |
| 224 | 2,4,7,8,14,16,28,32,56,112 | | | | | |
| 225 | 3,5,9,15,25,45,75 | | | | | |
| 226 | 2,113 | | | | | |
| 228 | 2,3,4,6,12,19,38,57,76,114 | | | | | |
| 230 | 2,5,10,23,46,115 | | | | | |
| 232 | 2,4,8,29,58,116 | | | | | |

FIG. 14

| $N_{data}$ | $N_{COL}$ Candidates | $N_{ROW}$ $N_{data}/N_{COL}$ | $N_{ROT}$ Candidates ($N_{ss}<=4$) | $N_{ROT}$ Candidates ($N_{ss}>4$) | Stream Permutation ($N_{ss}<=4$) | Stream Permutation ($N_{ss}>4$) |
|---|---|---|---|---|---|---|
| 474 | 2,3,6,79,158,2 37 | | 113, 114, 115, 116, 117, 118, 119, 120, 121, 122, 123, 124, 125, 126, 127 | 54, 55, 56, 57, 58, 59, 60, 61, 62, 63, 64, 65, 66 | Bit reversal [0 2 1 3] | Choice 1: Bit reversal [0 4 2 6 1 5 3 7] Choice 2: Permutation chosen to maximize average subcarrier distance of adjacent streams, e.g., [0 5 2 7 3 6 1 4] |
| 476 | 2,4,7,14,17,28 ,34,68,119, 238 | | | | | |
| 480 | 2,3,4,5,6,8,10, 12,15,16,20, 24 ,30,32,40,48, 60,80,96,120, 160,240 | | | | | |

FIG. 15

| $N_{data}$ | $N_{COL}$ Candidates | $N_{ROW}$ $N_{data}/N_{COL}$ | $N_{ROT}$ Candidates ($N_{ss}$<=4) | $N_{ROT}$ Candidates ($N_{ss}$>4) | Stream Permutation ($N_{ss}$<=4) | Stream Permutation ($N_{ss}$>4) |
|---|---|---|---|---|---|---|
| 948 | 2,3,4,6,12,79,158,237,316,474 | | 232, 233, 234, 235, 236, 237, 238, 239, 240, 241, 242, 243, 244, 245, 246, 247, 248, 249, 250, 251, 252, 253, 254 | 113, 114, 115, 116, 117, 118, 119, 120, 121, 122, 123, 124, 125, 126, 127, 128, 129, 130 | Bit reversal [0 2 1 3] | Choice 1: Bit reversal [0 4 2 6 1 5 3 7] Choice 2: Permutation chosen to maximize average subcarrier distance of adjacent streams, e.g., [0 5 2 7 3 6 1 4] |
| 960 | 2,3,4,5,6,8,10,12,15,16,20,24,30,32,40,48,60,64,80,96,120,160,192,240,320,480 | | | | | |
| 972 | 2,3,4,6,9,12,18,27,36,54,81,108,162,243,324,486 | | | | | |
| 980 | 2,4,5,7,10,14,20,28,35,49,70,98,140,196,245,490 | | | | | |
| 984 | 2,3,4,6,8,12,24,41,82,123,164,246,328,492 | | | | | |
| 990 | 2,3,5,6,9,10,11,15,18,22,33,45,55,66,90,99,110,165,198,330,495 | | | | | |
| 996 | 2,3,4,6,12,83,166,249,332,498 | | | | | |

FIG. 16

| $N_{data}$ | $D_{TM}$ Candidates | $N_{data}$ | $D_{TM}$ Candidates |
|---|---|---|---|
| 38 | 2,19 | 474 | 2,3,6,79,158,237 |
| 40 | 2,4,5,8,10,20 | 476 | 2,4,7,14,17,28,34,68,119,238 |
| 42 | 2,3,6,7,14,21 | | |
| 44 | 2,4,11,22 | 480 | 2,3,4,5,6,8,10,12,15,16,20,24,30,32,40,48,60,80,96,120,160,240 |
| 46 | 2,23 | | |
| 48 | 2,3,4,6,8,12,16,24 | | |
| 96 | 2,3,4,6,8,12,16,24,32,48 | 948 | 2,3,4,6,12,79,158,237,316,474 |
| 98 | 2,7,14,49 | | |
| 100 | 2,4,5,10,20,25,50 | 960 | 2,3,4,5,6,8,10,12,15,16,20,24,30,32,40,48,60,64,80,96,120,160,192,240,320,480 |
| 102 | 2,3,6,17,34,51 | | |
| 104 | 2,4,8,13,26,52 | | |
| 106 | 2,53 | | |
| 216 | 2,3,4,6,8,9,12,18,24,27,36,54,72,108 | | |
| | | 972 | 2,3,4,6,9,12,18,27,36,54,81,108,162,243,324,486 |
| 218 | 2,109 | | |
| 220 | 2,4,5,10,11,20,22,44,55,110 | 980 | 2,4,5,7,10,14,20,28,35,49,70,98,140,196,245,490 |
| 222 | 2,3,6,37,74,111 | | |
| 224 | 2,4,7,8,14,16,28,32,56,112 | 984 | 2,3,4,6,8,12,24,41,82,123,164,246,328,492 |
| 225 | 3,5,9,15,25,45,75 | | |
| 226 | 2,113 | | |
| 228 | 2,3,4,6,12,19,38,57,76,114 | 990 | 2,3,5,6,9,10,11,15,18,22,30,33,45,55,66,90,99,110,165,198,330,495 |
| 230 | 2,5,10,23,46,115 | | |
| 232 | 2,4,8,29,58,116 | | |
| | | 996 | 2,3,4,6,12,83,166,249,332,498 |

FIG. 17

| $N_{data}$ | # exclusions | Exclusions |
|---|---|---|
| 38 | 6 | MCS9 & $N_{ss}$=1,2,4,5,7,8 |
| 40 | 6 | MCS9 & $N_{ss}$=1,2,4,5,7,8 |
| 42 | 0 | |
| 44 | 6 | MCS9 & $N_{ss}$=1,2,4,5,7,8 |
| 46 | 6 | MCS9 & $N_{ss}$=1,2,4,5,7,8 |
| 48 | 0 | |
| 96 | 2 | MCS9 & $N_{ss}$=7,8 |
| 98 | 8 | MCS6 & $N_{ss}$=5,7; MCS9 & $N_{ss}$=1,2,4,5,7,8 |
| 100 | 6 | MCS9 & $N_{ss}$=1,2,4,5,7,8 |
| 102 | 4 | MCS6 & $N_{ss}$=5,7; MCS9 & $N_{ss}$=7,8 |
| 104 | 6 | MCS9 & $N_{ss}$=1,2,4,5,7,8 |
| 106 | 8 | MCS6 & $N_{ss}$=5,7; MCS9 & $N_{ss}$=1,2,4,5,7,8 |
| 216 | 2 | MCS8 & $N_{ss}$=7,8 |
| 218 | 17 | MCS2 & $N_{ss}$=7; MCS5 & $N_{ss}$=5,7; MCS6 & $N_{ss}$=3,7; MCS7 & $N_{ss}$=4,5,7; MCS8 & $N_{ss}$=7,8; MCS9 & $N_{ss}$=1,2,3,4,5,7,8 |
| 220 | 12 | MCS5 & $N_{ss}$=5,7; MCS6 & $N_{ss}$=7; MCS7 & $N_{ss}$=4,5; MCS9 & $N_{ss}$=1,2,3,4,5,7,8 |
| 222 | 8 | MCS2 & $N_{ss}$=7; MCS6 & $N_{ss}$=3,7; MCS7 & $N_{ss}$=7; MCS8 & $N_{ss}$=7,8; MCS9 & $N_{ss}$=4,8 |
| 224 | 13 | MCS5 & $N_{ss}$=5,7; MCS7 & $N_{ss}$=4,5; MCS8 & $N_{ss}$=7,8; MCS9 & $N_{ss}$=1,2,3,4,5,7,8 |
| 225 | 17 | MCS0 & $N_{ss}$=1,3,5,7; MCS2 & $N_{ss}$=1,3,5,7; MCS4 & $N_{ss}$=5; MCS6 & $N_{ss}$=1,3,5,7; MCS7 & $N_{ss}$=3,6,7; MCS8 & $N_{ss}$=5 |
| 226 | 16 | MCS2 & $N_{ss}$=7; MCS5 & $N_{ss}$=5,7; MCS6 & $N_{ss}$=3,7; MCS7 & $N_{ss}$=4,5,7; MCS8 & $N_{ss}$=7; MCS9 & $N_{ss}$=1,2,3,4,5,7,8 |
| 228 | 4 | MCS6 & $N_{ss}$=7; MCS8 & $N_{ss}$=7; MCS9 & $N_{ss}$=4,8 |
| 230 | 15 | MCS2 & $N_{ss}$=7; MCS5 & $N_{ss}$=5,7; MCS6 & $N_{ss}$=3,7; MCS7 & $N_{ss}$=4,5,7; MCS9 & $N_{ss}$=1,2,3,4,5,7,8 |
| 232 | 11 | MCS5 & $N_{ss}$=5; MCS7 & $N_{ss}$=4,5; MCS8 & $N_{ss}$=7; MCS9 & $N_{ss}$=1,2,3,4,5,7,8 |

FIG. 18

| $N_{data}$ | # exclusions | Exclusions |
|---|---|---|
| 474 | 15 | MCS2 & $N_{ss}$=5; MCS4 & $N_{ss}$=5,7; MCS7 & $N_{ss}$=3,6,7,8; MCS8 & $N_{ss}$=5,7,8; MCS9 & $N_{ss}$=2,4,6,7,8 |
| 476 | 15 | MCS3 & $N_{ss}$=5; MCS4 & $N_{ss}$=7; MCS7 & $N_{ss}$=2,5,7,8; MCS8 & $N_{ss}$=7,8; MCS9 & $N_{ss}$=1,2,4,5,6,7,8 |
| 480 | 9 | MCS7 & $N_{ss}$=6,8; MCS8 & $N_{ss}$=5,8; MCS9 & $N_{ss}$=2,4,6,7,8 |
| 948 | 27 | MCS2 & $N_{ss}$=5,7; MCS4 & $N_{ss}$=5,7,8; MCS5 & $N_{ss}$=5,6,7,8; MCS7 & $N_{ss}$=3,4,5,6,7,8; MCS8 & $N_{ss}$=4,5,7,8; MCS9 & $N_{ss}$=1,2,3,4,5,6,7,8 |
| 960 | 21 | MCS4 & $N_{ss}$=5,8; MCS5 & $N_{ss}$=5,6,7; MCS7 & $N_{ss}$=3,4,6,8; MCS8 & $N_{ss}$=4,5,7,8; MCS9 & $N_{ss}$=1,2,3,4,5,6,7,8 |
| 972 | 24 | MCS2 & $N_{ss}$=5,6,7; MCS4 & $N_{ss}$=3,5,7,8; MCS5 & $N_{ss}$=6,7,8; MCS6 & $N_{ss}$=2,3,5,6,7,8; MCS7 & $N_{ss}$=3,6,7; MCS8 & $N_{ss}$=4,5,6,7,8 |
| 980 | 23 | MCS1 & $N_{ss}$=5; MCS2 & $N_{ss}$=5; MCS4 & $N_{ss}$=8; MCS5 & $N_{ss}$=6,7,8; MCS6 & $N_{ss}$=5,6,8; MCS7 & $N_{ss}$=1,2,4,5,6,7,8 |
| 984 | 29 | MCS2 & $N_{ss}$=6,7; MCS4 & $N_{ss}$=3,5,7,8; MCS5 & $N_{ss}$=6,7,8; MCS6 & $N_{ss}$=2,3,5,6,7,8; MCS7 & $N_{ss}$=3,6,7,8; MCS8 & $N_{ss}$=4,5,6,7,8; MCS9 & $N_{ss}$=2,4,6,7,8 |
| 990 | 20 | MCS0 & $N_{ss}$=5,7; MCS1 & $N_{ss}$=7; MCS2 & $N_{ss}$=5; MCS4 & $N_{ss}$=5; MCS5 & $N_{ss}$=7; MCS6 & $N_{ss}$=3,6,8; MCS7 & $N_{ss}$=3,5,6,7,8; MCS8 & $N_{ss}$=5,6; MCS9 & $N_{ss}$=2,4,5,6 |
| 996 | 27 | MCS2 & $N_{ss}$=5,6,7; MCS4 & $N_{ss}$=3,5,7; MCS5 & $N_{ss}$=7,8; MCS6 & $N_{ss}$=2,3,5,6,7,8; MCS7 & $N_{ss}$=3,6,7,8; MCS8 & $N_{ss}$=5,6,7,8; MCS9 & $N_{ss}$=2,4,6,7,8 |

FIG. 19

SYSTEMS AND METHODS FOR IMPROVED COMMUNICATION EFFICIENCY IN WIRELESS NETWORKS

PRIORITY CLAIM

This application claims priority under 35 U.S.C. § 119(e) to U.S. Provisional App. No. 62/028,177, filed Jul. 23, 2014; U.S. Provisional App. No. 62/033,350, filed Aug. 5, 2014; U.S. Provisional App. No. 62/039,784, filed Aug. 20, 2014; and U.S. Provisional App. No. 62/064,301, filed Oct. 15, 2014; each of which is incorporated by reference herein in its entirety.

FIELD

Certain aspects of the present disclosure generally relate to wireless communications, and more particularly, to methods and apparatuses for providing messages according to various tone plans.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network can transmit/receive information between each other. Device transmissions can interfere with each other, and certain transmissions can selectively block other transmissions. Where many devices share a communication network, congestion and inefficient link usage can result. As such, systems, methods, and non-transitory computer-readable media are needed for improving communication efficiency in wireless networks.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present disclosure provides an apparatus for wireless communication. The apparatus includes a processing system configured to select from one of a 64-, 128-, 256-, 512-, and 1024-tone plan for wireless communication of a message. The 64-tone plan includes one of 38, 40, 42, 44, 46, and 48 data tones, at most one of 18, 16, 14, 12, 10, and 8 pilot tones when the 64-tone plan comprises at least 1 direct current tones, at most one of 14, 12, 10, 8, 6, and 4 pilot tones when the 64-tone plan comprises at least 5 direct current tones, and at most one of 12, 10, 8, 6, and 4 pilot tones when the 64-tone plan comprises at least 7 direct current tones. The 128-tone plan includes one of 96, 98, 100, 102, 104, and 106 data tones, at most one of 18, 16, 14, 12, 10, and 8 pilot tones when the 128-tone plan comprises at least 3 direct current tones, at most one of 16, 14, 12, 10, 8, and 6 pilot tones when the 128-tone plan comprises at least 5 direct current tones, and at most one of 14, 12, 10, 8, and 6 pilot tones when the 128-tone plan comprises at least 7 direct current tones. The 256-tone plan includes one of 216, 218, 220, 222, 224, 225, 226, 228, 230, and 230 data tones, at most one of 26, 24, 22, 20, 18, 17, 16, 14, 12, and 10 pilot tones when the 256-tone plan comprises at least 3 direct current tones, at most one of 24, 22, 20, 18, 16, 15, 14, 12, 10, and 8 pilot tones when the 256-tone plan comprises at least 5 direct current tones, and at most one of 22, 20, 18, 16, 14, 13, 12, 10, and 8 pilot tones when the 256-tone plan comprises at least 7 direct current tones. The 512-tone plan comprises one of 474, 476, and 480 data tones, at most one of 22, 20, and 16 pilot tones when the 512-tone plan comprises at least 5 direct current tones, and at most one of 16 and 14 pilot tones when the 512-tone plan comprises at least 11 direct current tones. The 1024-tone plan comprises one of 948, 960, 972, 980, 984, 990, and 996 data tones, at most one of 60, 48, 36, 28, 24, 18, and 12 pilot tones when the 1024-tone plan comprises at least 5 direct current tones, and at most one of 54, 42, 30, 22, 18, and 12 pilot tones when the 1024-tone plan comprises at least 11 direct current tones. The apparatus further, upon selecting the 64-tone plan, provides the message for transmission over a 5 MHz bandwidth. The apparatus further, upon selecting the 128-tone plan, provides the message for transmission over a 10 MHz bandwidth. The apparatus further, upon selecting the 256-tone plan, provides the message for transmission over a 20 MHz bandwidth. The apparatus further, upon selecting the 512-tone plan, provides the message for transmission over a 40 MHz bandwidth. The apparatus further, upon selecting the 1024-tone plan, provides the message for transmission over an 80 MHz bandwidth.

In some aspects, the apparatus includes an interleaver configured to interleave encoded data and generate a series of interleaved bits for transmission based on the interleaved encoded data, the interleaver comprising one or more stream interleavers corresponding to one or more spatial streams. The one or more stream interleavers include interleaved rotation indexes of at least one of 1 through 16 and a base subcarrier rotation of [0 2 1 3] for up to four spatial streams and interleaved rotation indexes of at least one of 1 through 10 and a base subcarrier rotation of [0 4 2 6 1 5 3 7], or [0 5 2 7 3 6 1 4] or another permutation chosen to maximize an average subcarrier distance of adjacent streams for more than four spatial streams and a transmission circuit configured to transmit the series of interleaved bits via the one or more spatial streams.

In some aspects, the one or more stream interleavers further include at least one of an interleaver depth of 2 or 19 for a data tone block of 38, an interleaver depth of 2, 4, 5, 8, 10, or 20 for a data tone block of 40, an interleaver depth of 2, 3, 6, 7, 14, or 21 for a data tone block of 42, an interleaver depth of 2, 4, 11, or 22 for a data tone block of 44, an interleaver depth of 2 or 23 for a data tone block of 46, and an interleaver depth of 2, 3, 4, 6, 8, 12, 16, or 24 for a data tone block of 48.

In some aspects, the apparatus includes an interleaver configured to interleave encoded data and generate a series of interleaved bits for transmission based on the interleaved encoded data, the interleaver comprising one or more stream interleavers corresponding to one or more spatial streams. The one or more stream interleavers include interleaved rotation indexes of at least one of 1 through 31 and a base subcarrier rotation of [0 2 1 3] for up to four spatial streams and interleaved rotation indexes of at least one of 1 through 18 and a base subcarrier rotation of [0 4 2 6 1 5 3 7], or [0 5 2 7 3 6 1 4] or another permutation chosen to maximize an average subcarrier distance of adjacent streams for more than four spatial streams and a transmission circuit configured to transmit the series of interleaved bits via the one or more spatial streams.

In some aspects, the one or more stream interleavers further include at least one of an interleaver depth of 2, 3, 4, 6, 8, 12, 16, 24, 32, or 48 for a data tone block of 96, an interleaver depth of 2, 7, 14, or 49 for a data tone block of 98, an interleaver depth of 2, 4, 5, 10, 20, 25, or 50 for a data tone block of 100, an interleaver depth of 2, 3, 6, 17, 34, or 51 for a data tone block of 102, an interleaver depth of 2, 4, 8, 13, 26, or 52 for a data tone block of 104, and an interleaver depth of 2 or 53 for a data tone block of 106.

In some aspects, the apparatus includes an interleaver configured to interleave encoded data and generate a series of interleaved bits for transmission based on the interleaved encoded data, the interleaver comprising one or more stream interleavers corresponding to one or more spatial streams. The one or more stream interleavers include interleaved rotation indexes of at least one of 50 through 62 and a base subcarrier rotation of [0 2 1 3] for up to four spatial streams and interleaved rotation indexes of at least one of 1 through 33 and a base subcarrier rotation of [0 4 2 6 1 5 3 7], or [0 5 2 7 3 6 1 4] or another permutation chosen to maximize an average subcarrier distance of adjacent streams for more than four spatial streams and a transmission circuit configured to transmit the series of interleaved bits via the one or more spatial streams.

In some aspects, the one or more stream interleavers further include at least one of an interleaver depth of 2, 3, 4, 6, 8, 9, 12, 18, 24, 27, 36, 54, 72, or 108 for a data tone block of 216, an interleaver depth of 2 or 109 for a data tone block of 218, an interleaver depth of 2, 4, 5, 10, 11, 20, 22, 44, 55, or 110 for a data tone block of 220, an interleaver depth of 2, 3, 6, 37, 74, or 111 for a data tone block of 222, an interleaver depth of 2, 4, 7, 8, 14, 16, 28, 32, 56, or 112 for a data tone block of 224, an interleaver depth of 3, 5, 9, 15, 25, 45, or 75 for a data tone block of 225, an interleaver depth of 2 or 113 for a data tone block of 226, an interleaver depth of 2, 3, 4, 6, 12, 19, 38, 57, 76, or 114 for a data tone block of 228, an interleaver depth of 2, 5, 10, 23, 46, or 115 for a data tone block of 230, and an interleaver depth of 2, 4, 8, 29, 58, or 116 for a data tone block of 232.

In some aspects, the apparatus includes an interleaver configured to interleave encoded data and generate a series of interleaved bits for transmission based on the interleaved encoded data, the interleaver comprising one or more stream interleavers corresponding to one or more spatial streams. The one or more stream interleavers include interleaved rotation indexes of at least one of 113 through 127 and a base subcarrier rotation of [0 2 1 3] for up to four spatial streams and interleaved rotation indexes of at least one of 54 through 66 and a base subcarrier rotation of [0 4 2 6 1 5 3 7], or [0 5 2 7 3 6 1 4] or another permutation chosen to maximize an average subcarrier distance of adjacent streams for more than four spatial streams and a transmission circuit configured to transmit the series of interleaved bits via the one or more spatial streams.

In some aspects, the one or more stream interleavers further include at least one of an interleaver depth of 2, 3, 6, 79, 158, or 237 for a data tone block of 474, an interleaver depth of 2, 4, 7, 14, 17, 28, 34, 68, 119, or 238 for a data tone block of 476, and an interleaver depth of 2, 3, 4, 5, 6, 8, 10, 12, 15, 16, 20, 24, 30, 32, 40, 48, 60, 80, 96, 120, 160, or 240 for a data tone block of 480.

In some aspects, the apparatus includes an interleaver configured to interleave encoded data and generate a series of interleaved bits for transmission based on the interleaved encoded data, the interleaver comprising one or more stream interleavers corresponding to one or more spatial streams. The one or more stream interleavers include interleaved rotation indexes of at least one of 232 through 254 and a base subcarrier rotation of [0 2 1 3] for up to four spatial streams and interleaved rotation indexes of at least one of 113 through 130 and a base subcarrier rotation of [0 4 2 6 1 5 3 7], or [0 5 2 7 3 6 1 4] or another permutation chosen to maximize an average subcarrier distance of adjacent streams for more than four spatial streams and a transmission circuit configured to transmit the series of interleaved bits via the one or more spatial streams.

In some aspects, the one or more stream interleavers further include at least one of an interleaver depth of 2, 3, 4, 6, 12, 79, 158, 237, 316, or 474 for a data tone block of 948, an interleaver depth of 2, 3, 4, 5, 6, 8, 10, 12, 15, 16, 20, 24, 30, 32, 40, 48, 60, 64, 80, 96, 120, 160, 192, 240, 320, or 480 for a data tone block of 960, an interleaver depth of 2, 3, 4, 6, 9, 12, 18, 27, 36, 54, 81, 108, 162, 243, 324, or 486 for a data tone block of 972, an interleaver depth of 2, 4, 5, 7, 10, 14, 20, 28, 35, 49, 70, 98, 140, 196, 245, or 490 for a data tone block of 980, an interleaver depth of 2, 3, 4, 6, 8, 12, 24, 41, 82, 123, 164, 246, 328, or 492 for a data tone block of 984, an interleaver depth of 2, 3, 5, 6, 9, 10, 11, 15, 18, 22, 30, 33, 45, 55, 66, 90, 99, 110, 165, 198, 330, or 495 for a data tone block of 990, and an interleaver depth of 2, 3, 4, 6, 12, 83, 166, 249, 332, or 498 for a data tone block of 996.

One aspect of the present disclosure provides a method of wireless communication. The method includes selecting, at a wireless device, from one of a 64-, 128-, 256-, 512-, and 1024-tone plan for wireless communication of a message, wherein the 64-tone plan comprises one of 38, 40, 42, 44, 46, and 48 data tones, at most one of 18, 16, 14, 12, 10, and 8 pilot tones when the 64-tone plan comprises at least 1 direct current tones, at most one of 14, 12, 10, 8, 6, and 4 pilot tones when the 64-tone plan comprises at least 5 direct current tones, and at most one of 12, 10, 8, 6, and 4 pilot tones when the 64-tone plan comprises at least 7 direct current tones; the 128-tone plan comprises one of 96, 98, 100, 102, 104, and 106 data tones, at most one of 18, 16, 14, 12, 10, and 8 pilot tones when the 128-tone plan comprises at least 3 direct current tones, at most one of 16, 14, 12, 10, 8, and 6 pilot tones when the 128-tone plan comprises at least 5 direct current tones, and at most one of 14, 12, 10, 8, and 6 pilot tones when the 128-tone plan comprises at least 7 direct current tones; the 256-tone plan comprises one of 216, 218, 220, 222, 224, 225, 226, 228, 230, and 230 data tones, at most one of 26, 24, 22, 20, 18, 17, 16, 14, 12, and 10 pilot tones when the 256-tone plan comprises at least 3 direct current tones, at most one of 24, 22, 20, 18, 16, 15, 14, 12, 10, and 8 pilot tones when the 256-tone plan comprises at least 5 direct current tones, and at most one of 22, 20, 18, 16, 14, 13, 12, 10, and 8 pilot tones when the 256-tone plan comprises at least 7 direct current tones; the 512-tone plan comprises one of 474, 476, and 480 data tones, at most one of 22, 20, and 16 pilot tones when the 512-tone plan comprises at least 5 direct current tones, and at most one of 16 and 14 pilot tones when the 512-tone plan comprises at least 11 direct current tones; and the 1024-tone plan comprises one of 948, 960, 972, 980, 984, 990, and 996 data tones, at most one of 60, 48, 36, 28, 24, 18, and 12 pilot tones when the 1024-tone plan comprises at least 5 direct current tones, and at most one of 54, 42, 30, 22, 18, and 12 pilot tones when the 1024-tone plan comprises at least 11 direct current tones. The method further includes upon selecting the 64-tone plan, providing the message for transmission over a 5 MHz bandwidth; upon selecting the 128-tone plan, providing the message for transmission over a 10 MHz bandwidth; upon selecting the 256-tone plan, providing the message for transmission over a 20 MHz bandwidth; upon selecting the 512-tone plan, providing the message for transmission over a 40 MHz bandwidth; and upon selecting the 1024-tone plan, providing the message for transmission over a 80 MHz bandwidth.

One aspect of the present disclosure provides an apparatus for wireless communication. The apparatus includes means for selecting from one of a 64-, 128-, 256-, 512-, and 1024-tone plan for wireless communication of a message, wherein the 64-tone plan comprises one of 38, 40, 42, 44, 46, and 48 data tones, at most one of 18, 16, 14, 12, 10, and 8 pilot tones when the 64-tone plan comprises at least 1 direct current tones, at most one of 14, 12, 10, 8, 6, and 4 pilot tones when the 64-tone plan comprises at least 5 direct current tones, and at most one of 12, 10, 8, 6, and 4 pilot tones when the 64-tone plan comprises at least 7 direct current tones, the 128-tone plan comprises one of 96, 98, 100, 102, 104, and 106 data tones, at most one of 18, 16, 14, 12, 10, and 8 pilot tones when the 128-tone plan comprises at least 3 direct current tones, at most one of 16, 14, 12, 10, 8, and 6 pilot tones when the 128-tone plan comprises at least 5 direct current tones, and at most one of 14, 12, 10, 8, and 6 pilot tones when the 128-tone plan comprises at least 7 direct current tones; the 256-tone plan comprises one of 216, 218, 220, 222, 224, 225, 226, 228, 230, and 230 data tones, at most one of 26, 24, 22, 20, 18, 17, 16, 14, 12, and 10 pilot tones when the 256-tone plan comprises at least 3 direct current tones, at most one of 24, 22, 20, 18, 16, 15, 14, 12, 10, and 8 pilot tones when the 256-tone plan comprises at least 5 direct current tones, and at most one of 22, 20, 18, 16, 14, 13, 12, 10, and 8 pilot tones when the 256-tone plan comprises at least 7 direct current tones; the 512-tone plan comprises one of 474, 476, and 480 data tones, at most one of 22, 20, and 16 pilot tones when the 512-tone plan comprises at least 5 direct current tones, and at most one of 16 and 14 pilot tones when the 512-tone plan comprises at least 11 direct current tones; and the 1024-tone plan comprises one of 948, 960, 972, 980, 984, 990, and 996 data tones, at most one of 60, 48, 36, 28, 24, 18, and 12 pilot tones when the 1024-tone plan comprises at least 5 direct current tones, and at most one of 54, 42, 30, 22, 18, and 12 pilot tones when the 1024-tone plan comprises at least 11 direct current tones. The apparatus further includes means for, upon selecting the 64-tone plan, providing the message for transmission over a 5 MHz bandwidth, means for, upon selecting the 128-tone plan, providing the message for transmission over a 10 MHz bandwidth, means for, upon selecting the 256-tone plan, providing the message for transmission over a 20 MHz bandwidth, means for, upon selecting the 512-tone plan, providing the message for transmission over a 40 MHz bandwidth, and means for, upon selecting the 1024-tone plan, providing the message for transmission over a 80 MHz bandwidth.

One aspect of the present disclosure provides a non-transitory computer-readable medium comprising code that, when executed, causes an apparatus to select from one of a 64-, 128-, 256-, 512-, and 1024-tone plan for wireless communication of a message, wherein the 64-tone plan comprises one of 38, 40, 42, 44, 46, and 48 data tones, at most one of 18, 16, 14, 12, 10, and 8 pilot tones when the 64-tone plan comprises at least 1 direct current tones, at most one of 14, 12, 10, 8, 6, and 4 pilot tones when the 64-tone plan comprises at least 5 direct current tones, and at most one of 12, 10, 8, 6, and 4 pilot tones when the 64-tone plan comprises at least 7 direct current tones; the 128-tone plan comprises one of 96, 98, 100, 102, 104, and 106 data tones, at most one of 18, 16, 14, 12, 10, and 8 pilot tones when the 128-tone plan comprises at least 3 direct current tones, at most one of 16, 14, 12, 10, 8, and 6 pilot tones when the 128-tone plan comprises at least 5 direct current tones, and at most one of 14, 12, 10, 8, and 6 pilot tones when the 128-tone plan comprises at least 7 direct current tones; the 256-tone plan comprises one of 216, 218, 220, 222, 224, 225, 226, 228, 230, and 230 data tones, at most one of 26, 24, 22, 20, 18, 17, 16, 14, 12, and 10 pilot tones when the 256-tone plan comprises at least 3 direct current tones, at most one of 24, 22, 20, 18, 16, 15, 14, 12, 10, and 8 pilot tones when the 256-tone plan comprises at least 5 direct current tones, and at most one of 22, 20, 18, 16, 14, 13, 12, 10, and 8 pilot tones when the 256-tone plan comprises at least 7 direct current tones; the 512-tone plan comprises one of 474, 476, and 480 data tones, at most one of 22, 20, and 16 pilot tones when the 512-tone plan comprises at least 5 direct current tones, and at most one of 16 and 14 pilot tones when the 512-tone plan comprises at least 11 direct current tones; and the 1024-tone plan comprises one of 948, 960, 972, 980, 984, 990, and 996 data tones, at most one of 60, 48, 36, 28, 24, 18, and 12 pilot tones when the 1024-tone plan comprises at least 5 direct current tones, and at most one of 54, 42, 30, 22, 18, and 12 pilot tones when the 1024-tone plan comprises at least 11 direct current tones. The apparatus, further, upon selecting the 64-tone plan, provide the message for transmission over a 5 MHz bandwidth; upon selecting the 128-tone plan, provide the message for transmission over a 10 MHz bandwidth; upon selecting the 256-tone plan, provide the message for transmission over a 20 MHz bandwidth; upon selecting the 512-tone plan, provide the message for transmission over a 40 MHz bandwidth; and upon selecting the 1024-tone plan, provide the message for transmission over a 80 MHz bandwidth.

Another aspect provides another apparatus configured to perform wireless communication. The apparatus includes a memory that stores instructions. The apparatus further includes a processor coupled with the memory. The processor is configured to execute the instructions to generate a message for wireless communication according to at least one of a set of 52 tones, for allocation to an individual device, including 48 data tones and 4 pilot tones, and a set of 106 tones, for allocation to an individual device, including 102 data tones and 4 pilot tones. The processor is further configured to execute the instructions to provide the message for transmission.

In various embodiments, the processor can be further configured to execute the instructions to interleave encoded data, for the message generated according to the set of 52 tones, using an interleaver depth of 16 and a base subcarrier rotation of 11. In various embodiments, the processor can be further configured to execute the instructions to interleave encoded data, for the message generated according to the set of 52 tones, using a number of interleaver rows equal to three times a number of coded bits per single subcarrier for each spatial stream used to transmit the message. In various embodiments, the processor can be further configured to execute the instructions to map tones of the message, for the message generated according to the set of 52 tones, using a low density parity check (LDPC) tone mapping distance (DTM) of 3.

In various embodiments, the processor can be further configured to execute the instructions to interleave encoded data, for the message generated according to the set of 106 tones, using an interleaver depth of 17 and a base subcarrier rotation of 29. In various embodiments, the processor can be further configured to execute the instructions to interleave encoded data, for the message generated according to the set of 106 tones, using a number of interleaver rows equal to six times a number of coded bits per single subcarrier for each spatial stream used to transmit the message. In various embodiments, the processor can be further configured to execute the instructions to map tones of the message, for the message generated according to the set of 106 tones, using a low density parity check (LDPC) tone mapping distance (DTM) of 6.

In various embodiments, the processor can be configured to provide the message for transmission over no more than four spatial streams when using binary convolutional code interleaving. In various embodiments, the apparatus can be a mobile station, and the processor can be configured to provide the message for transmission by being configured to transmit the message through a transmitter and an antenna of the mobile station to an access point serving the mobile station. In various embodiments, the apparatus can be an access point, and the processor can be configured to provide the message for transmission by being configured to transmit the message through a transmitter and an antenna of the access point to a mobile station served by the access point.

Another aspect provides another method of wireless communication. The method includes generating a message for wireless communication according to at least one of a set of 52 tones, for allocation to an individual device, including 48 data tones and 4 pilot tones, and a set of 106 tones, for allocation to an individual device, including 102 data tones and 4 pilot tones. The method further includes providing the message for transmission.

In various embodiments, the method can further include interleaving encoded data, for the message generated according to the set of 52 tones, using an interleaver depth of 16 and a base subcarrier rotation of 11. In various embodiments, the method can further include interleaving encoded data, for the message generated according to the set of 52 tones, using a number of interleaver rows equal to three times a number of coded bits per single subcarrier for each spatial stream used to transmit the message. In various embodiments, the method can further include mapping tones of the message, for the message generated according to the set of 52 tones, using a low density parity check (LDPC) tone mapping distance (DTM) of 3.

In various embodiments, the method can further include interleaving encoded data, for the message generated according to the set of 106 tones, using an interleaver depth of 17 and a base subcarrier rotation of 29. In various embodiments, the method can further include interleaving encoded data, for the message generated according to the set of 106 tones, using a number of interleaver rows equal to six times a number of coded bits per single subcarrier for each spatial stream used to transmit the message. In various embodiments, the method can further include mapping tones of the message, for the message generated according to the set of 106 tones, using a low density parity check (LDPC) tone mapping distance (DTM) of 6.

In various embodiments, the method can further include providing the message for transmission over no more than four spatial streams when using binary convolutional code interleaving. In various embodiments, the method can be performed on a mobile station, and providing the message for transmission includes transmitting the message through a transmitter and an antenna of the mobile station to an access point serving the mobile station. In various embodiments, the method can be performed on an access point, and providing the message for transmission includes transmitting the message through a transmitter and an antenna of the access point to a mobile station served by the access point.

Another aspect provides another apparatus for wireless communication. The apparatus includes means for generating a message for wireless communication according to at least one of a set of 52 tones, for allocation to an individual device, including 48 data tones and 4 pilot tones, and a set of 106 tones, for allocation to an individual device, including 102 data tones and 4 pilot tones. The apparatus further includes means for providing the message for transmission.

In various embodiments, the apparatus can further include means for interleaving encoded data, for the message generated according to the set of 52 tones, using an interleaver depth of 16 and a base subcarrier rotation of 11. In various embodiments, the apparatus can further include means for interleaving encoded data, for the message generated according to the set of 52 tones, using a number of interleaver rows equal to three times a number of coded bits per single subcarrier for each spatial stream used to transmit the message. In various embodiments, the apparatus can further include means for mapping tones of the message, for the message generated according to the set of 52 tones, using a low density parity check (LDPC) tone means for mapping distance (DTM) of 3.

In various embodiments, the apparatus can further include means for interleaving encoded data, for the message generated according to the set of 106 tones, using an interleaver depth of 17 and a base subcarrier rotation of 29. In various embodiments, the apparatus can further include means for interleaving encoded data, for the message generated according to the set of 106 tones, using a number of interleaver rows equal to six times a number of coded bits per single subcarrier for each spatial stream used to transmit the message. In various embodiments, the apparatus can further include means for mapping tones of the message, for the message generated according to the set of 106 tones, using a low density parity check (LDPC) tone means for mapping distance (DTM) of 6.

In various embodiments, the apparatus can further include means for providing the message for transmission over no more than four spatial streams when using binary convolutional code interleaving. In various embodiments, the apparatus includes a mobile station, and means for providing the message for transmission includes means for transmitting the message through a transmitter and an antenna of the mobile station to an access point serving the mobile station. In various embodiments, the apparatus includes an access point, and means for providing the message for transmission includes means for transmitting the message through a transmitter and an antenna of the access point to a mobile station served by the access point.

Another aspect provides another non-transitory computer-readable medium. The medium includes instructions that, when executed, cause an apparatus to generate a message for wireless communication according to at least one of a set of 52 tones, for allocation to an individual device, including 48 data tones and 4 pilot tones, and a set of 106 tones, for allocation to an individual device, including 102 data tones and 4 pilot tones. The medium further includes instructions that, when executed, cause the apparatus to provide the message for transmission.

In various embodiments, the medium can further include instructions that, when executed, cause the apparatus to interleave encoded data, for the message generated according to the set of 52 tones, using an interleaver depth of 16 and a base subcarrier rotation of 11. In various embodiments, the medium can further include instructions that, when executed, cause the apparatus to interleave encoded data, for the message generated according to the set of 52 tones, using a number of interleaver rows equal to three times a number of coded bits per single subcarrier for each spatial stream used to transmit the message. In various embodiments, the medium can further include instructions that, when executed, cause the apparatus to map tones of the message, for the message generated according to the set of 52 tones, using a low density parity check (LDPC) tone mapping distance (DTM) of 3.

In various embodiments, the medium can further include instructions that, when executed, cause the apparatus to interleave encoded data, for the message generated according to the set of 106 tones, using an interleaver depth of 17 and a base subcarrier rotation of 29. In various embodiments, the medium can further include instructions that, when executed, cause the apparatus to interleave encoded data, for the message generated according to the set of 106 tones, using a number of interleaver rows equal to six times a number of coded bits per single subcarrier for each spatial stream used to transmit the message. In various embodiments, the medium can further include instructions that, when executed, cause the apparatus to map tones of the message, for the message generated according to the set of 106 tones, using a low density parity check (LDPC) tone mapping distance (DTM) of 6.

In various embodiments, the medium can further include instructions that, when executed, cause the apparatus to provide the message for transmission over no more than four spatial streams when using binary convolutional code interleaving. In various embodiments, the apparatus can be a mobile station, and the medium can further include instructions that, when executed, cause the apparatus to provide the message for transmission by transmitting the message through a transmitter and an antenna of the mobile station to an access point serving the mobile station. In various embodiments, the apparatus can be an access point, and the medium can further include instructions that, when executed, cause the apparatus to interleave provide the message for transmission by transmitting the message through a transmitter and an antenna of the access point to a mobile station served by the access point.

BRIEF DESCRIPTION OF THE DRAWINGS

FIG. 4 shows bounds for 64-, 128-, 256-, 512- and 1024-tone plans according to various embodiments.

FIG. 5 shows 64-tone plans according to various embodiments.

FIG. 6 shows 128-tone plans according to various embodiments.

FIG. 7 shows 256-tone plans according to various embodiments.

FIG. 8 shows 512-tone plans according to various embodiments.

FIG. 9 shows 1024-tone plans according to various embodiments.

FIG. 12 is a chart illustrating candidate interleaver parameters for different numbers of data tones, according to a 64-tone plan embodiment.

FIG. 13 is a chart illustrating candidate interleaver parameters for different numbers of data tones, according to a 128-tone plan embodiment.

FIG. 14 is a chart illustrating candidate interleaver parameters for different numbers of data tones, according to a 256-tone plan embodiment.

FIG. 15 is a chart illustrating candidate interleaver parameters for different numbers of data tones, according to a 512-tone plan embodiment.

FIG. 16 is a chart illustrating candidate interleaver parameters for different numbers of data tones, according to a 1024-tone plan embodiment.

FIG. 17 is a chart illustrating exemplary low density parity check (LDPC) tone mapping distances (DTMs) for different numbers of data tones (Ndata).

FIG. 18 is a chart illustrating exemplary modulation and coding scheme (MCS) validity for different numbers of data tones (Ndata).

FIG. 19 is another chart illustrating exemplary modulation and coding scheme (MCS) validity for different numbers of data tones (Ndata).

DETAILED DESCRIPTION

Figure 1:
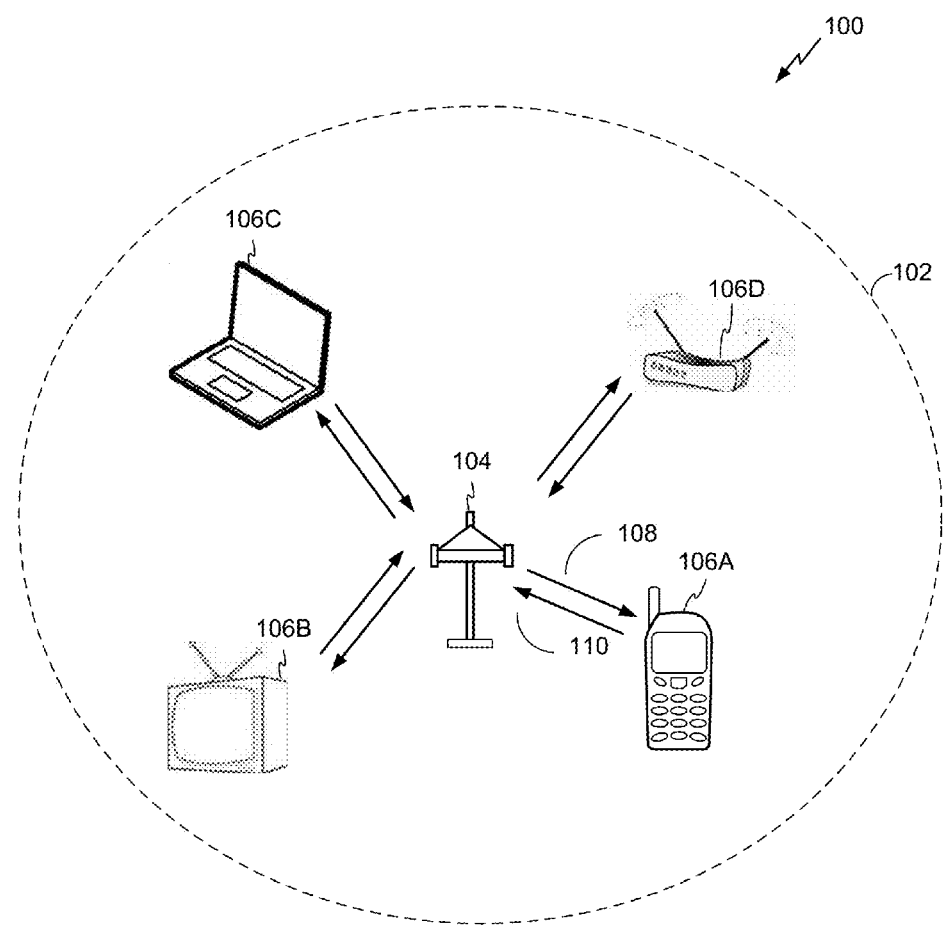
FIG. 1 illustrates an example of a wireless communication system in which aspects of the present disclosure can be employed.

Various aspects of the novel systems, apparatuses, and methods are described more fully hereinafter with reference to the accompanying drawings. The teachings disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A WLAN can be used to interconnect nearby devices together, employing widely used networking protocols. The various aspects described herein can apply to any communication standard, such as Wi-Fi or, more generally, any member of the IEEE 802.11 family of wireless protocols.

In some aspects, wireless signals can be transmitted according to a high-efficiency 802.11 protocol using orthogonal frequency-division multiplexing (OFDM), direct-sequence spread spectrum (DSSS) communications, a combination of OFDM and DSSS communications, or other schemes.

In some implementations, a WLAN includes various devices which are the components that access the wireless network. For example, there can be two types of devices: access points ("APs") and clients (also referred to as stations, or "STAs"). In general, an AP serves as a hub or base station for the WLAN and a STA serves as a user of the WLAN. For example, a STA can be a laptop computer, a personal digital assistant (PDA), a mobile phone, etc. In an example, a STA connects to an AP via a Wi-Fi (e.g., IEEE 802.11 protocol such as 802.11ax) compliant wireless link to obtain general connectivity to the Internet or to other wide area networks. In some implementations a STA can also be used as an AP.

The techniques described herein can be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system can utilize sufficiently different directions to concurrently transmit data belonging to multiple user terminals. A TDMA system can allow multiple user terminals to share the same frequency channel by dividing the transmission signal into different time slots, each time slot being assigned to different user terminal. A TDMA system can implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers can also be called tones, bins, etc. With OFDM, each sub-carrier can be independently modulated with data. An OFDM system can implement IEEE 802.11 or some other standards known in the art. An SC-FDMA system can utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system can implement 3GPP-LTE (3rd Generation Partnership Project Long Term Evolution) or other standards.

The teachings herein can be incorporated into (e.g., implemented within or performed by) a variety of wired or wireless apparatuses (e.g., nodes). In some aspects, a wireless node implemented in accordance with the teachings herein can comprise an access point or an access terminal.

An access point ("AP") can comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") can also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure can be employed. The wireless communication system 100 can operate pursuant to a wireless standard, for example the 802.11ax standard. The wireless communication system 100 can include an AP 104, which communicates with STAs 106.

A variety of processes and methods can be used for transmissions in the wireless communication system 100 between the AP 104 and the STAs 106. For example, signals can be transmitted and received between the AP 104 and the STAs 106 in accordance with OFDM/OFDMA techniques. If this is the case, the wireless communication system 100 can be referred to as an OFDM/OFDMA system. Alternatively, signals can be transmitted and received between the AP 104 and the STAs 106 in accordance with CDMA techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 can provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather can function as a peer-to-peer network between the STAs 106. Accordingly, the functions of the AP 104 described herein can alternatively be performed by one or more of the STAs 106.

Figure 2:
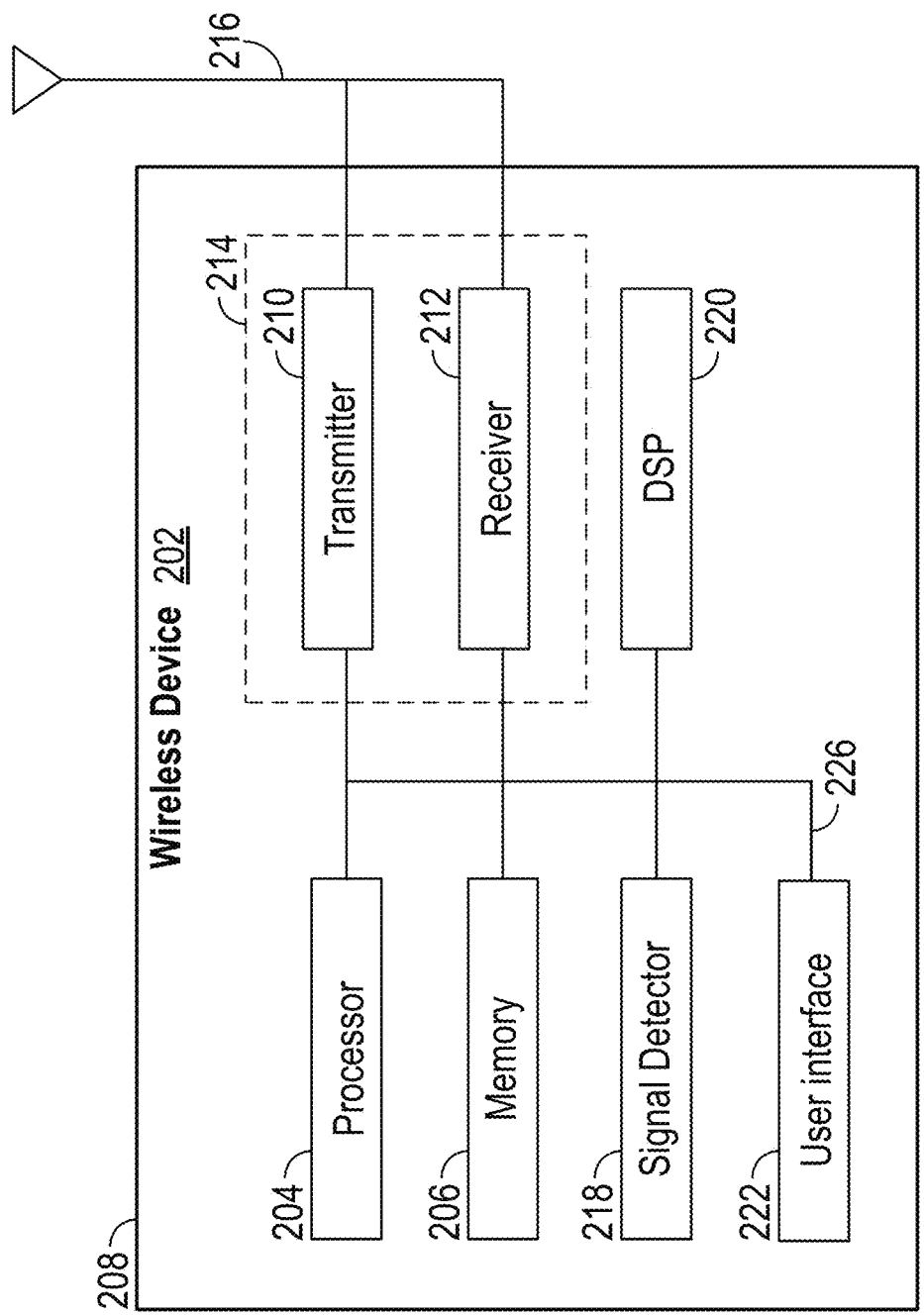
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can comprise the AP 104 or one of the STAs 106.

The wireless device 202 can include a processor 204 which controls operation of the wireless device 202. The processor 204 can also be referred to as a central processing unit (CPU). Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas, which can be utilized during MIMO communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can comprise a physical layer data unit (PPDU). In some aspects, the PPDU is referred to as a packet.

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art will appreciate the components of the wireless device 202 can be coupled together or accept or provide inputs to each other using some other mechanism.

Although a number of separate components are illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can comprise an AP 104 or any of the STAs 106A-106D, and can be used to transmit and/or receive communications. The communications exchanged between devices in a wireless network can include data units which can comprise packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

Certain aspects of the present disclosure support allowing APs 104 to allocate STAs 106 transmissions in optimized ways to improve efficiency. Both high efficiency wireless (HEW) stations, stations utilizing an 802.11 high efficiency protocol (such as 802.11ax), and stations using older or legacy 802.11 protocols (such as 802.11b), can compete or coordinate with each other in accessing a wireless medium. In some embodiments, the high-efficiency 802.11 protocol described herein can allow for HEW and legacy stations to interoperate according to various OFDM tone plans (which can also be referred to as tone maps). In some embodiments, HEW stations can access the wireless medium in a more efficient manner. Accordingly, in the case of apartment buildings or densely-populated public spaces, APs and/or STAs that use the high-efficiency 802.11 protocol can experience reduced latency and increased network throughput even as the number of active wireless devices increases, thereby improving user experience.

In some embodiments, APs 104 can transmit on a wireless medium according to various DL tone plans for HEW STAs. For example, with respect to FIG. 1, the STAs 106A-106D can be HEW STAs. In some embodiments, the HEW STAs can communicate using a symbol duration four times that of a legacy STA. Accordingly, each symbol which is transmitted may be four times as long in duration. When using a longer symbol duration, each of the individual tones may only require one-quarter as much bandwidth to be transmitted. For example, in various embodiments, a 1× symbol duration can be 4 ms and a 4× symbol duration can be 16 ms. The AP 104 can transmit messages to the HEW STAs 106A-106D according to one or more tone plans, based on a communication bandwidth.

Figure 3:
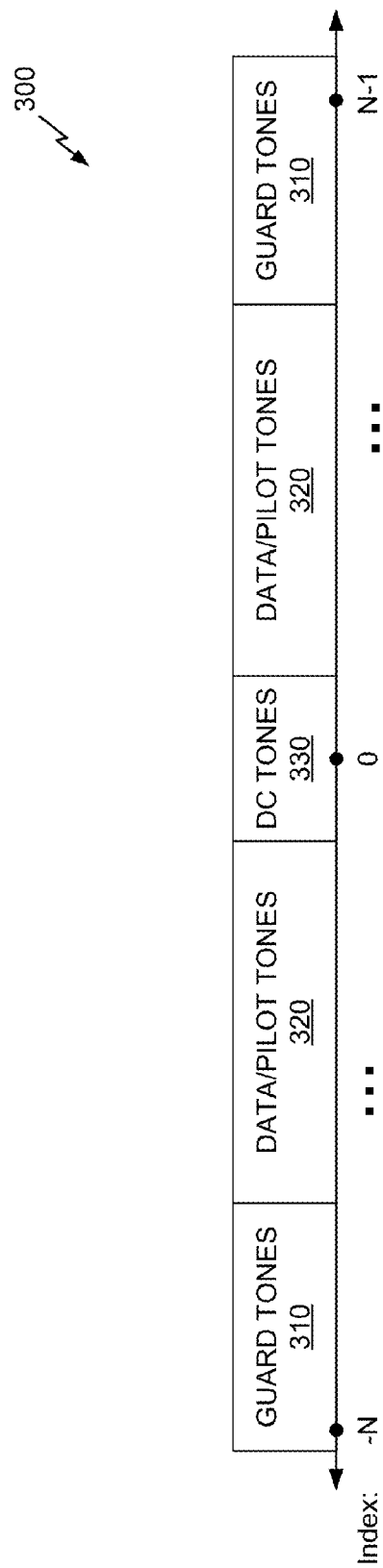
FIG. 3 shows an exemplary 2N-tone plan, according to one embodiment.

FIG. 3 shows an exemplary 2N-tone plan 300, according to one embodiment. In an embodiment, the tone plan 300 corresponds to OFDM tones, in the frequency domain, generated using a 2N-point FFT. The tone plan 300 includes 2N OFDM tones indexed −N to N−1. The tone plan 300 includes two sets of guard tones 310, two sets of data/pilot tones 320, and a set of direct current (DC) tones 330. In various embodiments, the guard tones 310 and DC tones 330 can be null. In various embodiments, the tone plan 300 includes another suitable number of pilot tones and/or includes pilot tones at other suitable tone locations.

Although a 2N-tone plan 300 is shown in FIG. 3, similar tone plans can be used for any value of N (such as 32-, 48-, 64-, 96-, 128-, 192-, 256-, 320-, 384-, 448-, 512-, 768-, 1024, 1280-, 1536-, 1792-, and 2048-tone plans, among others). In various embodiments, each tone plan can correspond to a communication bandwidth such as, for example, 5 MHz, 10 MHz, 20 MHz, 40 MHz, 80 MHz, and 160 MHz.

In some aspects, it may be desirable to specify tone plans which are suitable based on a certain level of error in transmitting. For example, certain implementations of WiFi may use a transmit center frequency error of +/−20 parts per million (ppm), or 40 ppm total (adding together the tolerable range). In a 5 MHz transmission with 4× symbol duration, this 40 ppm error requirement may necessitate the use of 5 DC tones. If multiple devices transmit simultaneously, the requirement may be up to 80 ppm, as the errors of each device may be additive with each other. Accordingly, in an 80 ppm (+/−40 ppm) scenario, 7 DC tones may be needed. If frequency pre-correction and/or finer ppm requirements are used, such as 10 ppm, 3 or 5 DC tones may be used for 4× symbol duration transmissions. Thus, the number of DC tones which are used may be based, at least in part, on the level of carrier frequency offset which is allowed in transmission.

Further, in order to be useful, tone plans may also need to satisfy certain BCC (binary convolutional code) interleaving, LDPC (low-density parity check) tone mapping distance designs as well as be valid for a number of different possible modulation and coding schemes (MCS). Generally, in choosing a tone plan, it may be beneficial to first obtain the upper bound of the number of data tones (Ndata) with the minimum number of DC, guard, and pilot tones. Next, it may be useful to determine the feasible number of data tones (Ndata) subject to the upper bounds and to certain other criteria. First, the divisors of Ndata may be used for BCC interleaving depth $N_{COL}$. Next, divisors of Ndata may also be used as LDPC tone mapping distance $D_{TM}$ that are in between the ones for existing tone plans. Finally, it may be beneficial is the number of excluded combinations of MCS and number of data streams is kept relatively small. Generally, if there are left-over tones after this tone mapping, they may be used as extra DC, guard, or pilot tones.

FIG. 4 shows upper bounds for 64-, 128-, 256-, 512-, and 1024-tone plans according to various embodiments. In particular, FIG. 4 shows upper bounds to the number of data tones (Ndata) for 64-, 128-, 256-, 512-, and 1024-tone plans in embodiments having 1, 3, 5, 7, or 11 DC tones, according to the bandwidth used. These upper bounds also use the minimum number of guard tones and pilot tones possible. For example, if the FFT size is 64, and there is one DC tone, 7 guard tones, and 4 pilot tones, this leaves 52 other tones which may be used as data tones.

FIG. 5 shows 64 tone plans according to various embodiments. In various embodiments, a 64 tone plan includes 38 data tones, at most 18 pilot tones (in embodiments with 1 DC tone), at most 14 pilot tones (in embodiments with 5 DC tones), at most 12 pilot tones (in embodiments with 7 DC tones), and a −20.83% gain over 48 data tones, and a −26.92% gain over 52 data tones. As illustrated, each of the feasible number of data tones, from 38 to 48, will obtain a negative gain over 52 data tones (as there are fewer tones) and a negative gain over 48 data tones (except for 48 data tones). In various embodiments, a 64 tone plan includes 40 data tones, at most 16 pilot tones (in embodiments with 1 DC tone), at most 12 pilot tones (in embodiments with 5 DC tones), at most 10 pilot tones (in embodiments with 7 DC tones), and a −16.67% gain over 48 data tones, and a −23.08% gain over 52 data tones. In various embodiments, a 64 tone plan includes 42 data tones, at most 14 pilot tones (in embodiments with 1 DC tone), at most 10 pilot tones (in embodiments with 5 DC tones), at most 8 pilot tones (in embodiments with 7 DC tones), and a −12.5% gain over 48 data tones, and a −19.23% gain over 52 data tones. In various embodiments, a 64 tone plan includes 44 data tones, at most 12 pilot tones (in embodiments with 1 DC tone), at most 8 pilot tones (in embodiments with 5 DC tones), at most 6 pilot tones (in embodiments with 7 DC tones), and a −8.33% gain over 48 data tones, and a −15.38% gain over 52 data tones. In various embodiments, a 64 tone plan includes 46 data tones, at most 10 pilot tones (in embodiments with 1 DC tone), at most 6 pilot tones (in embodiments with 5 DC tones), at most 4 pilot tones (in embodiments with 7 DC tones), and a −4.17% gain over 48 data tones, and a −11.54% gain over 52 data tones. In various embodiments, a 64 tone plan includes 48 data tones, at most 8 pilot tones (in embodiments with 1 DC tone), and at most 4 pilot tones (in embodiments with 5 DC tones), and a 0% gain over 48 data tones, and a −7.69% gain over 52 data tones. As illustrated, 48 data tones may not be used where there are 7 DC tones, as there may not be enough tones remaining in order to provide a needed number of pilot tones.

In one example, 48 data tones and 4 pilot tones can form a 52-tone resource unit (RU), which in some embodiments can be another term for a distinct set of tones allocated to an individual destination device. Thus, each RU is a basic unit according to which an entire bandwidth is assigned. Moreover, each OFDMA user may be assigned an allocation of multiple RUs. For example, 96 data tones can be allocated as four sets RUs having 24 data tones, two RUs having 24 data tones plus one RU having 48 data tones, or two RUs having 48 data tones. As another example, 216 data tones can be allocated as nine RUs having 24 data tones, seven RUs having 24 data tones plus one RU having 48 data tones, five RUs having 24 data tones plus two RUs having 48 data tones, three RUs having 24 data tones plus three RUs having 48 data tones, or one RU having 24 data tones plus four RUs having 48 data tones.

FIG. 6 shows 128 tone plans according to various embodiments. In various embodiments, a 128 tone plan includes 96 data tones, at most 18 pilot tones (in embodiments with 3 DC tones), at most 16 pilot tones (in embodiments with 5 DC tones), at most 14 pilot tones (in embodiments with 7 DC tones), and a −11.11% gain over a tone plan with 108 data tones. In various embodiments, a 128 tone plan includes 98 data tones, at most 16 pilot tones (in embodiments with 3 DC tones), at most 14 pilot tones (in embodiments with 5 DC tones), at most 12 pilot tones (in embodiments with 7 DC tones), and a −9.26% gain over a tone plan with 108 data tones. In various embodiments, a 128 tone plan includes 100 data tones, at most 14 pilot tones (in embodiments with 3 DC tones), at most 12 pilot tones (in embodiments with 5 DC tones), at most 10 pilot tones (in embodiments with 7 DC tones), and a −7.41% gain over a tone plan with 108 data tones. In various embodiments, a 128 tone plan includes 102 data tones, at most 12 pilot tones (in embodiments with 3 DC tones), at most 10 pilot tones (in embodiments with 5 DC tones), at most 8 pilot tones (in embodiments with 7 DC tones), and a −5.56% gain over a tone plan with 108 data tones. In various embodiments, a 128 tone plan includes 104 data tones, at most 10 pilot tones (in embodiments with 3 DC tones), at most 8 pilot tones (in embodiments with 5 DC tones), at most 6 pilot tones (in embodiments with 7 DC tones), and a −3.7% gain over a tone plan with 108 data tones. In various embodiments, a 128 tone plan includes 106 data tones, at most 8 pilot tones (in embodiments with 3 DC tones), at most 6 pilot tones (in embodiments with 5 DC tones), and a −1.85% gain over a tone plan with 108 data tones. As illustrated, 106 data tones may not be used where there are 7 DC tones, as there may not be enough tones remaining in order to provide a needed number of pilot tones.

In one example, 102 data tones and 4 pilot tones can form a 106-tone RU. As discussed above, each OFDMA user may be assigned an allocation of multiple RUs. For example 222 data tones can be allocated as one RU having 102 data tones plus five RUs having 24 data tones, one RU having 102 data tones plus one RU having 48 data tones plus three RUs having 24 data tones, or one RU having 102 data tones plus two RUs having 48 data tones plus one RU having 24 data tones. As another example, 228 data tones can be allocated as two RUs having 102 data tones plus one RU having 24 data tones.

FIG. 6 shows 256 tone plans according to various embodiments. In various embodiments, a 256 tone plan includes 216 data tones, at most 26 pilot tones (in embodiments with 3 DC tones), at most 24 pilot tones (in embodiments with 5 DC tones), at most 22 pilot tones (in embodiments with 7 DC tones), and a −7.69% gain over a tone plan with 234 data tones. In various embodiments, a 256 tone plan includes 218 data tones, at most 24 pilot tones (in embodiments with 3 DC tones), at most 22 pilot tones (in embodiments with 5 DC tones), at most 20 pilot tones (in embodiments with 7 DC tones), and a −6.84% gain over a tone plan with 234 data tones. In various embodiments, a 256 tone plan includes 220 data tones, at most 22 pilot tones (in embodiments with 3 DC tones), at most 20 pilot tones (in embodiments with 5 DC tones), at most 18 pilot tones (in embodiments with 7 DC tones), and a −5.98% gain over a tone plan with 234 data tones. In various embodiments, a 256 tone plan includes 222 data tones, at most 20 pilot tones (in embodiments with 3 DC tones), at most 18 pilot tones (in embodiments with 5 DC tones), at most 16 pilot tones (in embodiments with 7 DC tones), and a −5.13% gain over a tone plan with 234 data tones. In various embodiments, a 256 tone plan includes 224 data tones, at most 18 pilot tones (in embodiments with 3 DC tones), at most 16 pilot tones (in embodiments with 5 DC tones), at most 14 pilot tones (in embodiments with 7 DC tones), and a −4.27% gain over a tone plan with 234 data tones. In various embodiments, a 256 tone plan includes 225 data tones, at most 17 pilot tones (in embodiments with 3 DC tones), at most 15 pilot tones (in embodiments with 5 DC tones), at most 13 pilot tones (in embodiments with 7 DC tones), and a −3.85% gain over a tone plan with 234 data tones. In various embodiments, a 256 tone plan includes 226 data tones, at most 16 pilot tones (in embodiments with 3 DC tones), at most 14 pilot tones (in embodiments with 5 DC tones), at most 12 pilot tones (in embodiments with 7 DC tones), and a −3.42% gain over a tone plan with 234 data tones. In various embodiments, a 256 tone plan includes 228 data tones, at most 14 pilot tones (in embodiments with 3 DC tones), at most 12 pilot tones (in embodiments with 5 DC tones), at most 10 pilot tones (in embodiments with 7 DC tones), and a −2.56% gain over a tone plan with 234 data tones. In various embodiments, a 256 tone plan includes 230 data tones, at most 12 pilot tones (in embodiments with 3 DC tones), at most 10 pilot tones (in embodiments with 5 DC tones), at most 8 pilot tones (in embodiments with 7 DC tones), and a −1.71% gain over a tone plan with 234 data tones. In various embodiments, a 256 tone plan includes 232 data tones, at most 10 pilot tones (in embodiments with 3 DC tones), at most 8 pilot tones (in embodiments with 5 DC tones), and a −0.85% gain over a tone plan with 234 data tones. As illustrated, 232 data tones may not be used where there are 7 DC tones, as there may not be enough tones remaining in order to provide a needed number of pilot tones.

FIG. 8 shows 512 tone plans according to various embodiments. In various embodiments, a 512 tone plan includes 474 data tones, at most 22 pilot tones (in embodiments with 5 DC tones), at most 16 pilot tones (in embodiments with 11 DC tones), and a 1.28% gain over a tone plan with 468 data tones. In various embodiments, a 512 tone plan includes 476 data tones, at most 20 pilot tones (in embodiments with 5 DC tones), at most 14 pilot tones (in embodiments with 11 DC tones), and a 1.71% gain over a tone plan with 468 data tones. In various embodiments, a 512 tone plan includes 480 data tones, at most 16 pilot tones (in embodiments with 5 DC tones), and a 2.56% gain over a tone plan with 468 data tones. As illustrated, 480 data tones may not be used where there are 11 DC tones, as there may not be enough tones remaining in order to provide a needed number of pilot tones.

FIG. 9 shows 1024 tone plans according to various embodiments. In various embodiments, a 1024 tone plan includes 948 data tones, at most 60 pilot tones (in embodiments with 5 DC tones), at most 54 pilot tones (in embodiments with 11 DC tones), and a 1.28% gain over a tone plan with 936 data tones. Note that the comparison tone plan, with 936 data tones, is based on using a tone plan based on duplicating four 256 tone plans. In various embodiments, a 1024 tone plan includes 960 data tones, at most 48 pilot tones (in embodiments with 5 DC tones), at most 42 pilot tones (in embodiments with 11 DC tones), and a 2.56% gain over a tone plan with 936 data tones. In various embodiments, a 1024 tone plan includes 972 data tones, at most 36 pilot tones (in embodiments with 5 DC tones), at most 30 pilot tones (in embodiments with 11 DC tones), and a 4.06% gain over a tone plan with 936 data tones. In various embodiments, a 1024 tone plan includes 980 data tones, at most 28 pilot tones (in embodiments with 5 DC tones), at most 22 pilot tones (in embodiments with 11 DC tones), and a 4.70% gain over a tone plan with 936 data tones. In various embodiments, a 1024 tone plan includes 984 data tones, at most 24 pilot tones (in embodiments with 5 DC tones), at most 18 pilot tones (in embodiments with 11 DC tones), and a 5.13% gain over a tone plan with 936 data tones. In various embodiments, a 1024 tone plan includes 990 data tones, at most 18 pilot tones (in embodiments with 5 DC tones), at most 12 pilot tones (in embodiments with 11 DC tones), and a 5.77% gain over a tone plan with 936 data tones. In various embodiments, a 1024 tone plan includes 996 data tones, at most 12 pilot tones (in embodiments with 5 DC tones), and a 6.41% gain over a tone plan with 936 data tones. As illustrated, 996 data tones may not be used where there are 11 DC tones, as there may not be enough tones remaining in order to provide a needed number of pilot tones.

Figure 10:
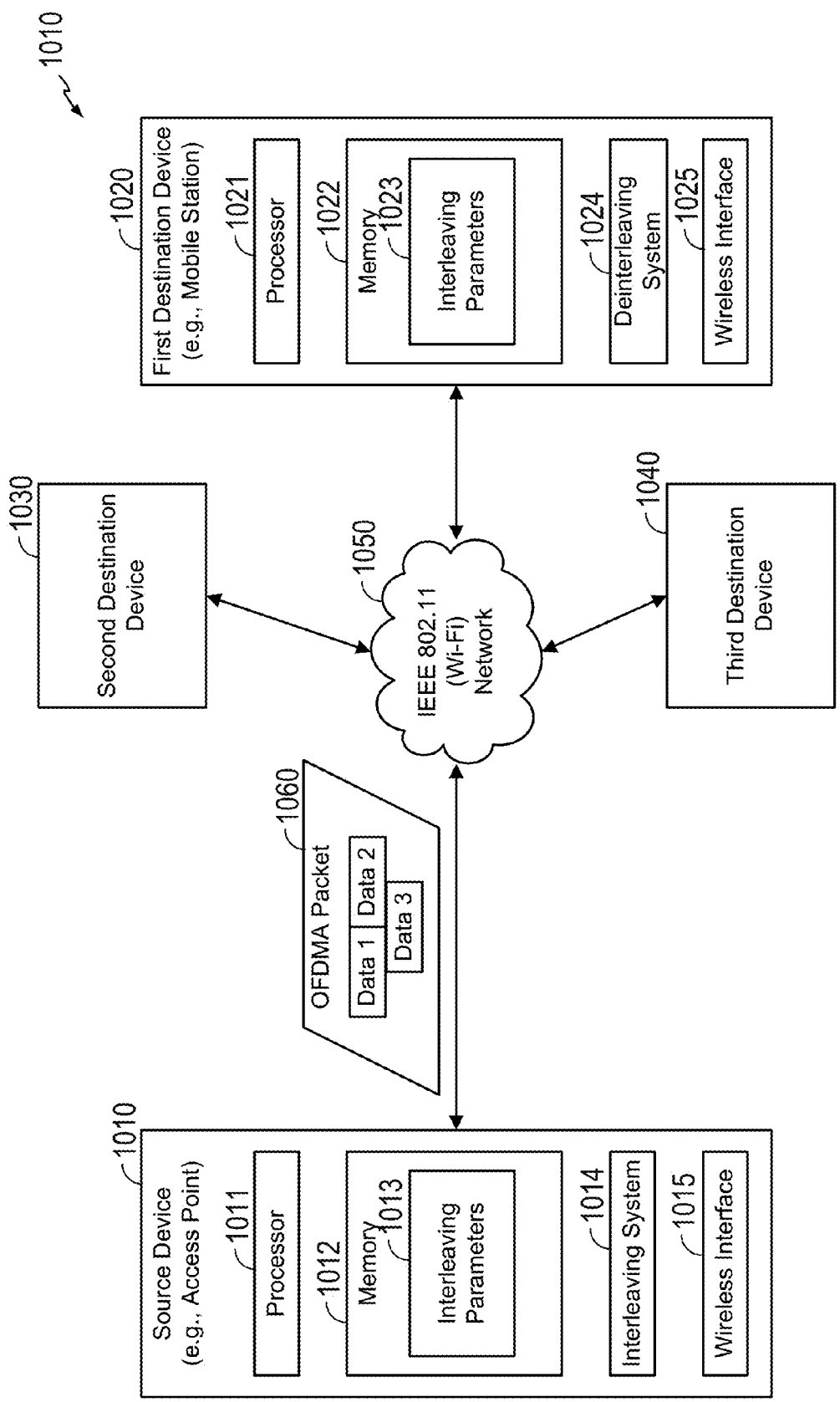
FIG. 10 shows a system that is operable to generate interleaving parameters for orthogonal frequency-division multiple access (OFDMA) tone plans, according to an embodiment.

FIG. 10 shows a system 1000 that is operable to generate interleaving parameters for orthogonal frequency-division multiple access (OFDMA) tone plans, according to an embodiment. The system 1000 includes a first device (e.g., a source device) 1010 configured to wirelessly communicate with a plurality of other devices (e.g., destination devices) 1020, 1030, and 1040 via a wireless network 1050. In alternate embodiments, a different number of source devices destination devices can be present in the system 1000. In various embodiments, the source device 1010 can include the AP 104 (FIG. 1) and the other devices 1020, 1030, and 1040 can include STAs 106 (FIG. 1). The system 1000 can include the system 100 (FIG. 1). In various embodiments, any of the devices 1010, 1020, 1030, and 1040 can include the wireless device 202 (FIG. 2).

In a particular embodiment, the wireless network 1050 is an Institute of Electrical and Electronics Engineers (IEEE) 802.11 wireless network (e.g., a Wi-Fi network). For example, the wireless network 1050 can operate in accordance with an IEEE 802.11 standard. In a particular embodiment, the wireless network 1050 supports multiple access communication. For example, the wireless network 1050 can support communication of a single packet 1060 to each of the destination devices 1020, 1030, and 1040, where the single packet 1060 includes individual data portions directed to each of the destination devices. In one example, the packet 1060 can be an OFDMA packet, as further described herein.

The source device 1010 can be an access point (AP) or other device configured to generate and transmit multiple access packet(s) to multiple destination devices. In a particular embodiment, the source device 1010 includes a processor 1011 (e.g., a central processing unit (CPU), a digital signal processor (DSP), a network processing unit (NPU), etc.), a memory 1012 (e.g., a random access memory (RAM), a read-only memory (ROM), etc.), and a wireless interface 1015 configured to send and receive data via the wireless network 1050. The memory 1012 can store binary convolutional code (BCC) interleaving parameters 1013 used by an interleaving system 1014 to interleave data according to the techniques described with respect to an interleaving system 1014 of FIG. 11.

As used herein, a "tone" can represent a frequency or set of frequencies (e.g., a frequency range) within which data can be communicated. A tone can alternately be referred to as a subcarrier. A "tone" can thus be a frequency domain unit, and a packet can span multiple tones. In contrast to tones, a "symbol" can be a time domain unit, and a packet can span (e.g., include) multiple symbols, each symbol having a particular duration. A wireless packet can thus be visualized as a two-dimensional structure that spans a frequency range (e.g., tones) and a time period (e.g., symbols).

As an example, a wireless device can receive a packet via an 80 megahertz (MHz) wireless channel (e.g., a channel having 80 MHz bandwidth). The wireless device can perform a 512-point fast Fourier transform (FFT) to determine 512 tones in the packet. A subset of the tones can be considered "useable" and the remaining tones can be considered "unusable" (e.g., can be guard tones, direct current (DC) tones, etc.). To illustrate, 496 of the 512 tones can be useable, including 474 data tones and 22 pilot tones. As another example, there can be 476 data tones and 20 pilot tones. It should be noted that the aforementioned channel bandwidths, transforms, and tone plans are just examples. In alternate embodiments, different channel bandwidths (e.g., 5 MHz, 6 MHz, 6.5 MHz, 40 MHz, 80 MHz, etc.), different transforms (e.g., 256-point FFT, 1024-point FFT, etc.), and/or different tone plans can be used.

In a particular embodiment, a packet can include different block sizes (e.g., a different number of data tones per sub-band) that are transmitted over one or more spatial streams. For example, the packet can include 12 data tones per sub-band, 36 data tones per sub-band, 72 data tones per sub-band, 120 data tones per sub-band, 156 data tones per sub-band, or 312 data tones per sub-band. Interleave depths, interleave rotation indexes, and base subcarrier rotations combinations can be provided for each block size.

In a particular embodiment, the interleaving parameters 1013 can be used by the interleaving system 1014 during generation of the multiple access packet 1060 to determine which data tones of the packet 1060 are assigned to individual destination devices. For example, the packet 1060 can include distinct sets of tones allocated (for example, as one or more resource units) to each individual destination device 1020, 1030, and 1040. To illustrate, the packet 1060 can utilize interleaved tone allocation.

The destination devices 1020, 1030, and 1040 can each include a processor (e.g., a processor 1021), a memory (e.g., a memory 1022), and a wireless interface (e.g., a wireless interface 1025). The destination devices 1020, 1030, and 1040 can also each include a deinterleaving system 1024 configured to deinterleave packets (e.g., single access packets or multiple access packets), as described with reference to a MIMO detector 1118 of FIG. 11. In one example, the memory 1022 can store interleaving parameters 1023 identical to the interleaving parameters 1013.

During operation, the source device 1010 can generate and transmit the packet 1060 to each of the destination devices 1020, 1030, and 1040 via the wireless network 1050. The packet 1060 can include distinct sets of data tones that are allocated to each individual destination device according to an interleaved pattern.

The system 1000 of FIG. 10 can thus provide OFDMA data tone interleaving parameters for use by source devices and destination devices to communicate over an IEEE 802.11 wireless network. For example, the interleaving parameters 1013, 1023 (or portions thereof) can be stored in a memory of the source and destination devices, as shown, can be standardized by a wireless standard (e.g., an IEEE 802.11 standard), etc. It should be noted that various data tone plans described herein can be applicable for both downlink (DL) as well as uplink (UL) OFDMA communication.

For example, the source device 1010 (e.g., an access point) can receive signal(s) via the wireless network 1050. The signal(s) can correspond to an uplink packet. In the packet, distinct sets of tones can be allocated to, and carry uplink data transmitted by, each of the destination devices (e.g., mobile stations) 1020, 1030, and 1040.

Figure 11:
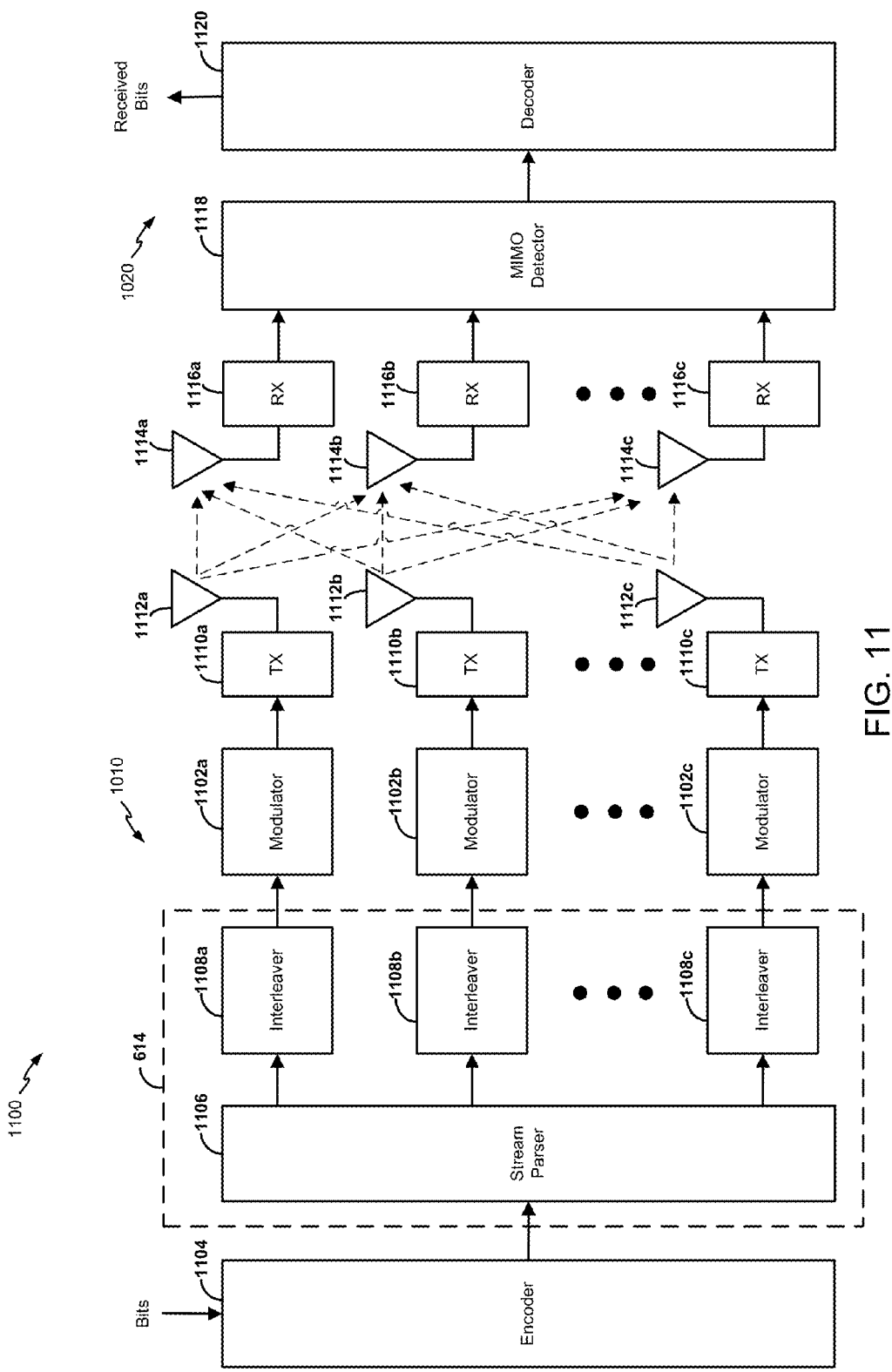
FIG. 11 shows an exemplary multiple-input-multiple-output (MIMO) system that can be implemented in wireless devices, such as a wireless device of FIG. 10, to transmit and receive wireless communications.

FIG. 11 shows an exemplary multiple-input-multiple-output (MIMO) system 1100 that can be implemented in wireless devices, such as the wireless device of FIG. 10, to transmit and receive wireless communications. The system 1100 includes the first device 1010 of FIG. 10 and the destination device 1020 of FIG. 10.

The first device 1010 includes an encoder 1104, the interleaving system 1014, a plurality of modulators 1102a-1102c, a plurality of transmission (TX) circuits 1110a-1110c, and a plurality of antennas 1112a-1112c. The destination device 1020 includes a plurality of antennas 1114a-1114c, a plurality of receive (RX) circuits 1116a-1116c, a MIMO detector 1118, and a decoder 1120.

A bit sequence can be provided to the encoder 1104. The encoder 1104 can be configured to encode the bit sequence. For example, the encoder 1104 can be configured to apply a forward error correcting (FEC) code to the bit sequence. The FEC code can be a block code, a convolutional code (e.g., a binary convolutional code), etc. The encoded bit sequence can be provided to the interleaving system 1014.

The interleaving system 1014 can include a stream parser 1106 and a plurality of spatial stream interleavers 1108a-1108c. The stream parser 1106 can be configured to parse the encoded bit stream from the encoder 1104 to the plurality of spatial stream interleavers 1108a-1108c.

Each interleaver 1108a-1108c can be configured to perform frequency interleaving. For example, the stream parser 1106 can output blocks of coded bits per symbol for each spatial stream used to transmit the message. Each block can be interleaved by a corresponding interleaver 1108a-1108c that writes to rows and reads out columns. The number of columns (Ncol), or the interleaver depth, can be based on the number of data tones (Ndata). The number of rows (Nrow) can be a function of the number of columns (Ncol) and the number of data tones (Ndata). For example, the number of rows (Nrow) can be equal to the number of data tones (Ndata) divided by the number of columns (Ncol) (e.g., Nrow=Ndata/Ncol).

FIG. 12 is a chart illustrating candidate interleaver parameters for different numbers of data tones, according to a 64-tone plan embodiment. In a particular embodiment, the interleaver depth (e.g., the number of columns (Ncol)) can be a factor of the number of data tones (Ndata). In various embodiments, a 38 data tone block can have an interleaver depth of 2 or 19. In various embodiments, a 40 data tone block can have an interleaver depth 2, 4, 5, 8, 10, or 20. In various embodiments, a 42 data tone block can have an interleaver depth of 2, 3, 6, 7, 14, or 21. In various embodiments, a 44 data tone block can have an interleaver depth of 2, 4, 11, or 22. In various embodiments, a 46 data tone block can have an interleaver depth of 2 or 23. In various embodiments, a 48 data tone block can have an interleaver depth of 2, 3, 4, 6, 8, 12, 16, or 24.

A frequency rotation can be applied to the spatial streams if there is more than one spatial stream. The frequency rotation can be based on a base subcarrier rotation (NROT) and a rotation index. The base subcarrier rotation (NROT) and the rotation index can be based on the number of data tones (Ndata) and the number of spatial streams (Nss).

For example, if the data tone block has 4 or less spatial streams (Nss), the base subcarrier rotation (NROT) can be any of 1-16. The rotation index (e.g., the $6^{th}$ column of FIG. 12) can be a bit reversal of [0 2 1 3] in this scenario. Alternatively, if the data tone block has more than 4 spatial streams (Nss), the base subcarrier rotation (NROT) can be any of 1-10. The rotation index (e.g., the 7th column of FIG. 12) can be a bit reversal of [0 4 2 6 1 5 3 7] in some embodiments, or the rotation index can be chosen to maximize (or increase) an average subcarrier distance of adjacent streams in other embodiments (e.g., [0 5 2 7 3 6 1 4]). Although a rotation index of [0 5 2 7 3 6 1 4] is used herein as one example of an index maximizing average subcarrier distance, any other rotation indexes that maximize (or increase) average subcarrier distance can be used. For example, any permutation which maximizes the average subcarrier distance of adjacent streams may be used, and [0 5 2 7 3 6 1 4] is only one example.

FIG. 13 is a chart illustrating candidate interleaver parameters for different numbers of data tones, according to a 128-tone plan embodiment. In a particular embodiment, the interleaver depth (e.g., the number of columns (NCOL)) can be a factor of the number of data tones (Ndata). In various embodiments, a 96 data tone block can have an interleaver depth of 2, 3, 4, 6, 8, 12, 16, 24, 32, or 48. In various embodiments, a 98 data tone block can have an interleaver depth 2, 7, 14, or 49. In various embodiments, a 100 data tone block can have an interleaver depth of 2, 4, 5, 10, 20, 25, or 50. In various embodiments, a 102 data tone block can have an interleaver depth of 2, 3, 6, 17, 34, or 51. In various embodiments, a 104 data tone block can have an interleaver depth of 2, 4, 8, 13, 26, or 52. In various embodiments, a 106 data tone block can have an interleaver depth of 2 or 53.

A frequency rotation can be applied to the spatial streams if there is more than one spatial stream. The frequency rotation can be based on a base subcarrier rotation (NROT) and a rotation index. The base subcarrier rotation (NROT) and the rotation index can be based on the number of data tones (Ndata) and the number of spatial streams (Nss).

For example, if the data tone block has 4 or less spatial streams (Nss), the base subcarrier rotation (NROT) can be any of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or 31. The rotation index (e.g., the $6^{th}$ column of FIG. 13) can be a bit reversal of [0 2 1 3] in this scenario. Alternatively, if the data tone block has more than 4 spatial streams (Nss), the base subcarrier rotation (NROT) can be any of 1, 2, 3, 4, 5, 6, 7, 8, 9, 10, 11, 12, 13, 14, 15, 16, 17, or 18. The rotation index (e.g., the 7th column of FIG. 13) can be a bit reversal of [0 4 2 6 1 5 3 7] in some embodiments, or the rotation index can be chosen to maximize (or increase) an average subcarrier distance of adjacent streams in other embodiments (e.g., [0 5 2 7 3 6 1 4]). Although a rotation index of [0 5 2 7 3 6 1 4] is used herein as one example of an index maximizing average subcarrier distance, any other rotation indexes that maximize (or increase) average subcarrier distance can be used.

FIG. 14 is a chart illustrating candidate interleaver parameters for different numbers of data tones, according to a 256-tone plan embodiment. In a particular embodiment, the interleaver depth (e.g., the number of columns (NCOL)) can be a factor of the number of data tones (Ndata). In various embodiments, a 216 data tone block can have an interleaver depth of 2, 3, 4, 6, 8, 9, 12, 18, 24, 27, 36, 54, 72, or 108. In various embodiments, a 218 data tone block can have an interleaver depth 2 or 109. In various embodiments, a 220 data tone block can have an interleaver depth of 2, 4, 5, 10, 11, 20, 22, 44, 55, or 110. In various embodiments, a 222 data tone block can have an interleaver depth of 2, 3, 6, 37, 74, or 111. In various embodiments, a 224 data tone block can have an interleaver depth of 2, 4, 7, 8, 14, 16, 28, 32, 56, or 112. In various embodiments, a 225 data tone block can have an interleaver depth of 3, 5, 9, 15, 25, 45, or 75. In various embodiments, a 226 data tone block can have an interleaver depth of 2 or 113. In various embodiments, a 228 data tone block can have an interleaver depth of 2, 3, 4, 6, 12, 19, 38, 57, 76, or 114. In various embodiments, a 230 data tone block can have an interleaver depth of 2, 5, 10, 23, 46, or 115. In various embodiments, a 232 data tone block can have an interleaver depth of 2, 4, 8, 29, 58, or 116.

A frequency rotation can be applied to the spatial streams if there is more than one spatial stream. The frequency rotation can be based on a base subcarrier rotation (NROT) and a rotation index. The base subcarrier rotation (NROT) and the rotation index can be based on the number of data tones (Ndata) and the number of spatial streams (Nss).

For example, if the data tone block has 4 or less spatial streams (Nss), the base subcarrier rotation (NROT) can be any of 50, 51, 52, 53, 54, 55, 56, 57, 58, 59, 60, 61, or 62. The rotation index (e.g., the $6^{th}$ column of FIG. 14) can be a bit reversal of [0 2 1 3] in this scenario. Alternatively, if the data tone block has more than 4 spatial streams (Nss), the base subcarrier rotation (NROT) can be any of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, or 33. The rotation index (e.g., the 7th column of FIG. 14) can be a bit reversal of [0 4 2 6 1 5 3 7] in some embodiments, or the rotation index can be chosen to maximize (or increase) an average subcarrier distance of adjacent streams in other embodiments (e.g., [0 5 2 7 3 6 1 4]). Although a rotation index of [0 5 2 7 3 6 1 4] is used herein as one example of an index maximizing average subcarrier distance, any other rotation indexes that maximize (or increase) average subcarrier distance can be used.

FIG. 15 is a chart illustrating candidate interleaver parameters for different numbers of data tones, according to a 512-tone plan embodiment. In a particular embodiment, the interleaver depth (e.g., the number of columns (NCOL)) can be a factor of the number of data tones (Ndata). In various embodiments, a 474 data tone block can have an interleaver depth of 2, 3, 6, 79, 158, or 237. In various embodiments, a 476 data tone block can have an interleaver depth of 2, 4, 7, 14, 17, 28, 34, 68, 119, or 238. In various embodiments, a 480 data tone block can have an interleaver depth of 2, 3, 4, 5, 6, 8, 10, 12, 15, 16, 20, 24, 30, 32, 40, 48, 60, 80, 96, 120, 160, or 240.

A frequency rotation can be applied to the spatial streams if there is more than one spatial stream. The frequency rotation can be based on a base subcarrier rotation (NROT) and a rotation index. The base subcarrier rotation (NROT) and the rotation index can be based on the number of data tones (Ndata) and the number of spatial streams (Nss).

For example, if the data tone block has 4 or less spatial streams (Nss), the base subcarrier rotation (NROT) can be any of 113, 114, 115, 116, 117, 118, 119, 120, 121, 122, 123, 124, 125, 126, or 127. The rotation index (e.g., the $6^{th}$ column of FIG. 15) can be a bit reversal of [0 2 1 3] in this scenario. Alternatively, if the data tone block has more than 4 spatial streams (Nss), the base subcarrier rotation (NROT) can be any of 54, 55, 56, 57, 58, 59, 60, 61, 62, 63, 64, 65, or 66. The rotation index (e.g., the 7th column of FIG. 15) can be a bit reversal of [0 4 2 6 1 5 3 7] in some embodiments, or the rotation index can be chosen to maximize (or increase) an average subcarrier distance of adjacent streams in other embodiments (e.g., [0 5 2 7 3 6 1 4]). Although a rotation index of [0 5 2 7 3 6 1 4] is used herein as one example of an index maximizing average subcarrier distance, any other rotation indexes that maximize (or increase) average subcarrier distance can be used.

FIG. 16 is a chart illustrating candidate interleaver parameters for different numbers of data tones, according to a 1024-tone plan embodiment. In a particular embodiment, the interleaver depth (e.g., the number of columns (NCOL)) can be a factor of the number of data tones (Ndata). In various embodiments, a 948 data tone block can have an interleaver depth of 2, 3, 4, 6, 12, 79, 158, 237, 316, or 474. In various embodiments, a 960 data tone block can have an interleaver depth of 2, 3, 4, 5, 6, 8, 10, 12, 15, 16, 20, 24, 30, 32, 40, 48, 60, 64, 80, 96, 120, 160, 192, 240, 320, or 480. In various embodiments, a 972 data tone block can have an interleaver depth of 2, 3, 4, 6, 9, 12, 18, 27, 36, 54, 81, 108, 162, 243, 324, or 486. In various embodiments, a 980 data tone block can have an interleaver depth of 2, 4, 5, 7, 10, 14, 20, 28, 35, 49, 70, 98, 140, 196, 245, or 490. In various embodiments, a 984 data tone block can have an interleaver depth of 2, 3, 4, 6, 8, 12, 24, 41, 82, 123, 164, 246, 328, or 492. In various embodiments, a 990 data tone block can have an interleaver depth of 2, 3, 5, 6, 9, 10, 11, 15, 18, 22, 30, 33, 45, 55, 66, 90, 99, 110, 165, 198, 330, or 495. In various embodiments, a 996 data tone block can have an interleaver depth of 2, 3, 4, 6, 12, 83, 166, 249, 332, or 498.

A frequency rotation can be applied to the spatial streams if there is more than one spatial stream. The frequency rotation can be based on a base subcarrier rotation (NROT) and a rotation index. The base subcarrier rotation (NROT) and the rotation index can be based on the number of data tones (Ndata) and the number of spatial streams (Nss).

For example, if the data tone block has 4 or less spatial streams (Nss), the base subcarrier rotation (NROT) can be any of 232, 233, 234, 235, 236, 237, 238, 239, 240, 241, 242, 243, 244, 245, 246, 247, 248, 249, 250, 251, 252, 253, or 254. The rotation index (e.g., the $6^{th}$ column of FIG. 16) can be a bit reversal of [0 2 1 3] in this scenario. Alternatively, if the data tone block has more than 4 spatial streams (Nss), the base subcarrier rotation (NROT) can be any of 113, 114, 115, 116, 117, 118, 119, 120, 121, 122, 123, 124, 125, 126, 127, 128, 129, or 130. The rotation index (e.g., the 7th column of FIG. 16) can be a bit reversal of [0 4 2 6 1 5 3 7] in some embodiments, or the rotation index can be chosen to maximize (or increase) an average subcarrier distance of adjacent streams in other embodiments (e.g., [0 5 2 7 3 6 1 4]). Although a rotation index of [0 5 2 7 3 6 1 4] is used herein as one example of an index maximizing average subcarrier distance, any other rotation indexes that maximize (or increase) average subcarrier distance can be used.

Referring back to FIG. 11, the outputs of each interleaver 1108a-1108c (e.g., transmit streams) can be provided to the corresponding modulator 1102a-1102c. Each modulator 1102a-1102c can be configured to modulate the corresponding transmit stream and pass the modulated transmit stream to the corresponding transmission circuit 1110a-1110c. In a particular embodiment, the bits (e.g., the transmit streams) can be modulated using Quadrature Phase Shift Keying (QPSK) modulation, Binary Phase Shift Keying (BPSK) modulation, or Quadrature Amplitude Modulation (QAM) (e.g., 16-QAM, 64-QAM, 256-QAM). The transmission circuits 1110a-1110c can be configure to transmit the modulated transmit streams over a wireless network (e.g., an IEEE 802.11 wireless network) via the corresponding antennas 1112a-1112c.

In a particular embodiment, the antennas 1112a-1112c are distinct and spatially separated antennas. In another embodiment, distinct signal can be combined into different polarizations and transmitted via a subset of the antennas 1112-1112c. For example, the distinct signals can be combined where spatial rotation or spatial spreading is performed and multiple spatial streams are mapped to a single antenna.

The receive circuits 1116a-1116c of the destination device 1029 can receive the interleaved encoded bits via the corresponding antennas 1114a-1114c. The outputs of the receive circuits 1116a-1116c are provided to the MIMO detector 1118, and the output of the MIMO detector 1118 is provided to the decoder 1120. In a particular embodiment, the MIMO detector 1118 can include a deinterleaving system configured to perform reverse operations of the interleaving system 1014. The decoder 1120 can output received bits which, without unrecoverable errors, are the same as the transmitted bits provided to the encoder 1104.

FIG. 17 is a chart illustrating exemplary low density parity check (LDPC) tone mapping distances (DTMs) for different numbers of data tones (Ndata). The mapping distance (DTM) can be at least as large as the number of coded bits per OFDM symbol (NCBPS) divided by the LDPC codeword length (LCW) (e.g., NCBPS/LCW≤DTM) so that each LDPC codeword covers the full range of tones. Additionally, the mapping distance (DTM) can be an integer divisor of the number of subcarriers (NSD). The mapping distance (DTM) can be constant over rates within each bandwidth to enable a tone de-mapper implemented at a Fast Fourier Transform (FFT) module of the receive circuits 1116a-1116c with fixed tone processing.

In various embodiments, the 38 data tone block can have a mapping distance (DTM) of 2 or 19. In various embodiments, the 40 data tone block can have a mapping distance (DTM) of 2, 4, 5, 8, 10, or 20. In various embodiments, the 42 data tone block can have a mapping distance (DTM) of 2, 3, 6, 7, 14, or 21. In various embodiments, the 44 data tone block can have a mapping distance (DTM) of 2, 4, 11, or 22. In various embodiments, the 46 data tone block can have a mapping distance (DTM) of 2 or 23. In various embodiments, the 48 data tone block can have a mapping distance (DTM) of 2, 3, 4, 6, 8, 12, 16, or 24.

In various embodiments, the 96 data tone block can have a mapping distance (DTM) of 2, 3, 4, 6, 8, 12, 16, 24, 32, or 48. In various embodiments, the 98 data tone block can have a mapping distance (DTM) of 2, 7, 14, or 49. In various embodiments, the 100 data tone block can have a mapping distance (DTM) of 2, 4, 5, 10, 20, 25, or 50. In various embodiments, the 102 data tone block can have a mapping distance (DTM) of 2, 3, 6, 17, 34, or 51. In various embodiments, the 104 data tone block can have a mapping distance (DTM) of 2, 4, 8, 13, 26, or 52. In various embodiments, the 106 data tone block can have a mapping distance (DTM) of 2 or 53.

In various embodiments, the 216 data tone block can have a mapping distance (DTM) of 2, 3, 4, 6, 8, 9, 12, 18, 24, 27, 36, 54, 72, or 108. In various embodiments, the 218 data tone block can have a mapping distance (DTM) of 2 or 109. In various embodiments, the 220 data tone block can have a mapping distance (DTM) of 2, 4, 5, 10, 11, 20, 22, 44, 55, or 110. In various embodiments, the 222 data tone block can have a mapping distance (DTM) of 2, 3, 6, 37, 74, or 111. In various embodiments, the 224 data tone block can have a mapping distance (DTM) of 2, 4, 7, 8, 14, 16, 28, 32, 56, or 112. In various embodiments, the 225 data tone block can have a mapping distance (DTM) of 3, 5, 9, 15, 25, 45, or 75. In various embodiments, the 226 data tone block can have a mapping distance (DTM) of 2 or 113. In various embodiments, the 228 data tone block can have a mapping distance (DTM) of 2, 3, 4, 6, 12, 19, 38, 57, 76, or 114. In various embodiments, the 230 data tone block can have a mapping distance (DTM) of 2, 5, 10, 23, 46, or 115. In various embodiments, the 232 data tone block can have a mapping distance (DTM) of 2, 4, 8, 29, 58, or 116.

In various embodiments, the 474 data tone block can have a mapping distance (DTM) of 2, 3, 6, 79, 158, or 237. In various embodiments, the 476 data tone block can have a mapping distance (DTM) of 2, 4, 7, 14, 17, 28, 34, 68, 119, or 238. In various embodiments, the 480 data tone block can have a mapping distance (DTM) of 2, 3, 4, 5, 6, 8, 10, 12, 15, 16, 20, 24, 30, 32, 40, 48, 60, 80, 96, 120, 160, or 240.

In various embodiments, the 948 data tone block can have a mapping distance (DTM) of 2, 3, 4, 6, 12, 79, 158, 237, 316, or 474. In various embodiments, the 960 data tone block can have a mapping distance (DTM) of 2, 3, 4, 5, 6, 8, 10, 12, 15, 16, 20, 24, 30, 32, 40, 48, 60, 64, 80, 96, 120, 160, 192, 240, 320, or 480. In various embodiments, the 972 data tone block can have a mapping distance (DTM) of 2, 3, 4, 6, 9, 12, 18, 27, 36, 54, 81, 108, 162, 243, 324, or 486. In various embodiments, the 980 data tone block can have a mapping distance (DTM) of 2, 4, 5, 7, 10, 14, 20, 28, 35, 49, 70, 98, 140, 196, 245, or 490. In various embodiments, the 984 data tone block can have a mapping distance (DTM) of 2, 3, 4, 6, 8, 12, 24, 41, 82, 123, 164, 246, 328, or 492. In various embodiments, the 990 data tone block can have a mapping distance (DTM) of 2, 3, 5, 6, 9, 10, 11, 15, 18, 22, 30, 33, 45, 55, 66, 90, 99, 110, 165, 198, 330, or 495. In various embodiments, the 996 data tone block can have a mapping distance (DTM) of 2, 3, 4, 6, 12, 83, 166, 249, 332, or 498.

FIG. 18 is a chart illustrating exemplary modulation and coding scheme (MCS) validity for different numbers of data tones (Ndata). The chart illustrates invalid MCS scenarios for MCS0-MCS9 for spatial streams up to eight spatial streams. MCS validity is defined in the IEEE 802.11ac specification. Generally, the rule for determining whether an MCS is valid is that the number of coded bits per single subcarrier for each spatial stream (NBPSCS) must be an integer multiple of the number of encoding streams. Further, the number of coded bits per encoding stream must be an integer multiple of the denominator in the code rate. Accordingly, certain MCS and spatial stream combinations may be invalid when these conditions are not met. In various embodiments, the 38 data tone block includes 6 exclusions. For example, where MCS9 & Nss=1,2,4,5,7,8. In various embodiments, the 40 data tone block includes 6 exclusions. For example, where MCS9 & Nss=1,2,4,5,7,8. In various embodiments, the 42 data tone block includes 0 exclusions. In various embodiments, the 44 data tone block includes 6 exclusions. For example, where MCS9 & Nss=1,2,4,5,7,8. In various embodiments, the 46 data tone block includes 6 exclusions. For example, where MCS9 & Nss=1,2,4,5,7,8. In various embodiments, the 48 data tone block includes 0 exclusions. In various embodiments, the 96 data tone block includes 2 exclusions. For example, where MCS9 & Nss=7, 8. In various embodiments, the 98 data tone block includes 8 exclusions. For example, where MCS6 & Nss=5,7; MCS9 & Nss=1,2,4,5,7,8. In various embodiments, the 100 data tone block includes 6 exclusions. For example, where MCS9 & Nss=1,2,4,5,7,8. In various embodiments, the 102 data tone block includes 4 exclusions. For example, where MCS6 & Nss=5,7; MCS9 & Nss=7,8. In various embodiments, the 104 data tone block includes 6 exclusions. For example, where MCS9 & Nss=1,2,4,5,7,8. In various embodiments, the 106 data tone block includes 8 exclusions. For example, where MCS6 & Nss=5,7; MCS9 & Nss=1,2,4,5,7,8.

In various embodiments, the 216 data tone block includes 2 exclusions. For example, where MCS8 & Nss=7,8. In various embodiments, the 218 data tone block includes 17 exclusions. For example, where MCS2 & Nss=7; MCS5 & Nss=5,7; MCS6 & Nss=3,7; MCS7 & Nss=4,5,7; MCS8 & Nss=7,8; MCS9 & Nss=1,2,3,4,5,7,8. In various embodiments, the 220 data tone block includes 12 exclusions. For example, where MCS5 & Nss=5,7; MCS6 & Nss=7; MCS7 & Nss=4,5; MCS9 & Nss=1,2,3,4,5,7,8. In various embodiments, the 222 data tone block includes 8 exclusions. For example, where MCS2 & Nss=7; MCS6 & Nss=3,7; MCS7 & Nss=7; MCS8 & Nss=7,8; MCS9 & Nss=4,8. In various embodiments, the 224 data tone block includes 13 exclusions. For example, where MCS5 & Nss=5,7; MCS7 & Nss=4,5; MCS8 & Nss=7,8; MCS9 & Nss=1,2,3,4,5,7,8. In various embodiments, the 225 data tone block includes 17 exclusions. For example, where MCS0 & Nss=1,3,5,7; MCS2 & Nss=1,3,5,7; MCS4 & Nss=5; MCS6 & Nss=1,3, 5,7; MCS7 & Nss=3,6,7; MCS8 & Nss=5. In various embodiments, the 225 data tone block includes 16 exclusions. For example, where MCS2 & Nss=7; MCS5 & Nss=5,7; MCS6 & Nss=3,7; MCS7 & Nss=4,5,7; MCS8 & Nss=7; MCS9 & Nss=1,2,3,4,5,7,8. In various embodiments, the 228 data tone block includes 4 exclusions. For example, where MCS6 & Nss=7; MCS8 & Nss=7; MCS9 & Nss=4,8. In various embodiments, the 230 data tone block includes 15 exclusions. For example, where MCS2 & Nss=7; MCS5 & Nss=5,7; MCS6 & Nss=3,7; MCS7 & Nss=4,5,7; MCS9 & Nss=1,2,3,4,5,7,8. In various embodiments, the 232 data tone block includes 11 exclusions. For example, where MCS5 & Nss=5; MCS7 & Nss=4,5; MCS8 & Nss=7; MCS9 & Nss=1,2,3,4,5,7,8.

FIG. 19 is a chart illustrating exemplary modulation and coding scheme (MCS) validity for different numbers of data tones (Ndata). The chart illustrates invalid MCS scenarios for MCS0-MCS9 for spatial streams up to eight spatial streams. In various embodiments, the 474 data tone block includes 15 exclusions. For example, where MCS2 & Nss=5; MCS4 & Nss=5,7; MCS7 & Nss=3,6,7,8; MCS8 & Nss=5,7,8; MCS9 & Nss=2,4,6,7,8. In various embodiments, the 476 data tone block includes 15 exclusions. For example, where MCS3 & Nss=5; MCS4 & Nss=7; MCS7 & Nss=2,5,7,8; MCS8 & Nss=7,8; MCS9 & Nss=1,2,4,5,6,7,8. In various embodiments, the 480 data tone block includes 9 exclusions. For example, where MCS7 & Nss=6,8; MCS8 & Nss=5,8; MCS9 & Nss=2,4,6,7,8. In various embodiments, the 948 data tone block includes 27 exclusions. For example, where MCS2 & Nss=5,7; MCS4 & Nss=5,7,8; MCS5 & Nss=5,6,7,8; MCS7 & Nss=3,4,5,6,7,8; MCS8 & Nss=4,5, 7,8; MCS9 & Nss=1,2,3,4,5,6,7,8. In various embodiments, the 960 data tone block includes 21 exclusions. For example, where MCS4 & Nss=5,8; MCS5 & Nss=5,6,7; MCS7 & Nss=3,4,6,8; MCS8 & Nss=4,5,7,8; MCS9 & Nss=1,2,3,4, 5,6,7,8. In various embodiments, the 972 data tone block includes 24 exclusions. For example, where MCS2 & Nss=5,6,7; MCS4 & Nss=3,5,7,8; MCS5 & Nss=6,7,8; MCS6 & Nss=2,3,5,6,7,8; MCS7 & Nss=3,6,7; MCS8 & Nss=4,5,6,7,8. In various embodiments, the 980 data tone block includes 23 exclusions. For example, where MCS1 & Nss=5; MCS2 & Nss=5; MCS4 & Nss=8; MCS5 & Nss=6, 7,8; MCS6 & Nss=5,6,8; MCS7 & Nss=1,5,7,8; MCS8 & Nss=4,6,8; MCS9 & Nss=1,2,4,5,6,7,8. In various embodiments, the 984 data tone block includes 29 exclusions. For example, where MCS2 & Nss=6,7; MCS4 & Nss=3,5,7,8; MCS5 & Nss=6,7,8; MCS6 & Nss=2,3,5,6,7,8; MCS7 & Nss=3,6,7,8; MCS8 & Nss=4,5,6,7,8; MCS9 & Nss=2,4,6, 7,8. In various embodiments, the 990 data tone block includes 20 exclusions. For example, where MCS0 & Nss=5,7; MCS1 & Nss=7; MCS2 & Nss=5; MCS4 & Nss=5; MCS5 & Nss=7; MCS6 & Nss=3,6,8; MCS7 & Nss=3,5,6,7,8; MCS8 & Nss=5,6; MCS9 & Nss=2,4,5,6. In various embodiments, the 996 data tone block includes 27 exclusions. For example, where MCS2 & Nss=5,6,7; MCS4 & Nss=3,5,7; MCS5 & Nss=7,8; MCS6 & Nss=2,3,5,6,7,8; MCS7 & Nss=3,6,7,8; MCS8 & Nss=5,6,7,8; MCS9 & Nss=2,4,6,7,8.

Figure 20:
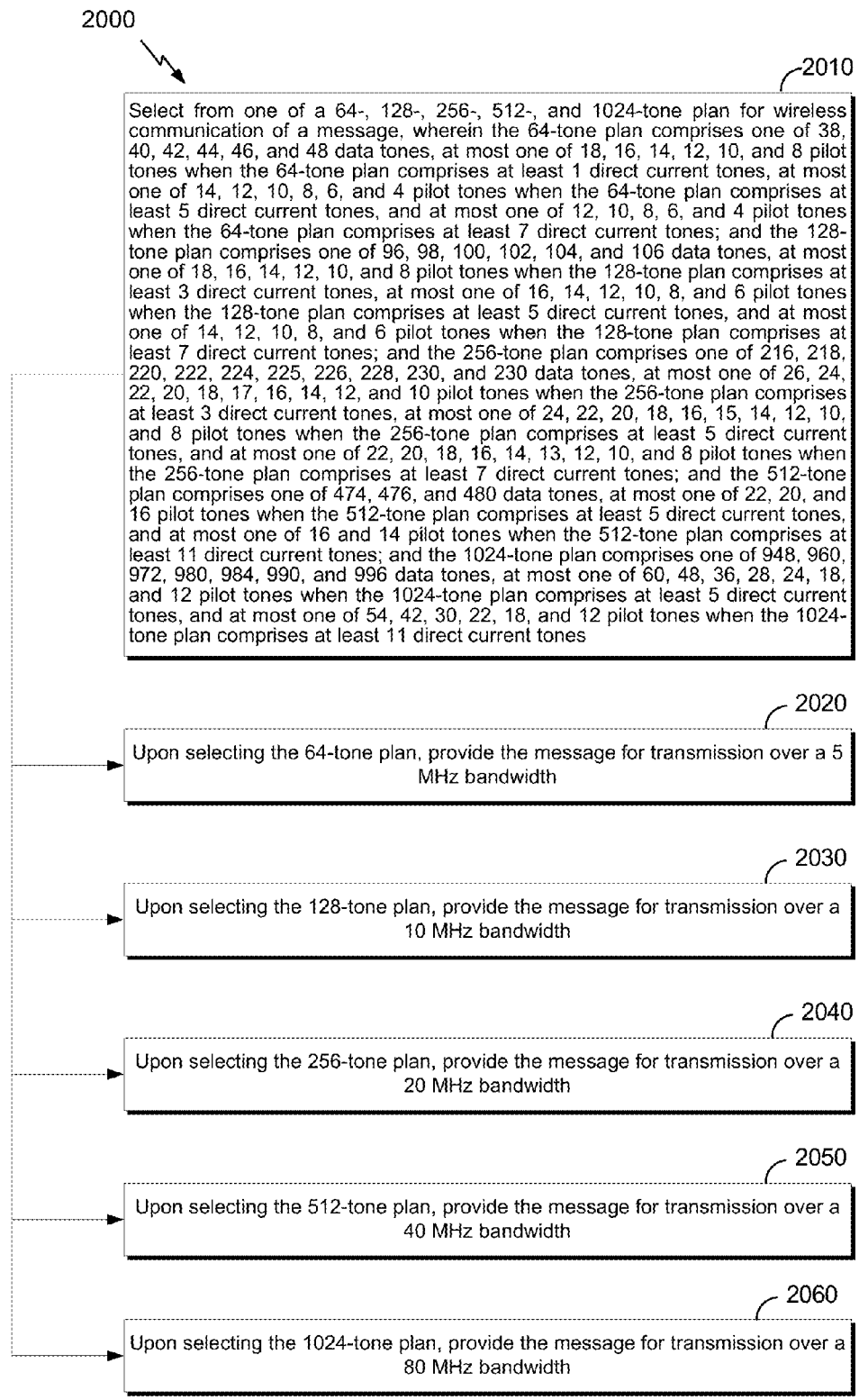
FIG. 20 shows a flowchart for an exemplary method of wireless communication that can be employed within the wireless communication system of FIG. 1.

FIG. 20 shows a flowchart 2000 for an exemplary method of wireless communication that can be employed within the wireless communication system 100 of FIG. 1. The method can be implemented in whole or in part by the devices described herein, such as the AP 104 (FIG. 1), any of the STAs 106 (FIG. 1), the wireless device 202 shown in FIG. 2, the devices 1010, 1020, 1030, or 1040 (FIG. 10). Although the illustrated method is described herein with reference to the wireless communication system 100 discussed above with respect to FIG. 1, the wireless device 202 discussed above with respect to FIG. 2, the system 1000 of FIG. 10, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 2010, a wireless device selects from one of a 64-, 128-, 256-, 512-, and 1024-tone plan for wireless communication of a message. The 64-tone plan includes one of 38, 40, 42, 44, 46, and 48 data tones, at most one of 18, 16, 14, 12, 10, and 8 pilot tones when the 64-tone plan comprises at least 1 direct current tones, at most one of 14, 12, 10, 8, 6, and 4 pilot tones when the 64-tone plan comprises at least 5 direct current tones, and at most one of 12, 10, 8, 6, and 4 pilot tones when the 64-tone plan comprises at least 7 direct current tones. The 128-tone plan includes one of 96, 98, 100, 102, 104, and 106 data tones, at most one of 18, 16, 14, 12, 10, and 8 pilot tones when the 128-tone plan comprises at least 3 direct current tones, at most one of 16, 14, 12, 10, 8, and 6 pilot tones when the 128-tone plan comprises at least 5 direct current tones, and at most one of 14, 12, 10, 8, and 6 pilot tones when the 128-tone plan comprises at least 7 direct current tones. The 256-tone plan includes one of 216, 218, 220, 222, 224, 225, 226, 228, 230, and 230 data tones, at most one of 26, 24, 22, 20, 18, 17, 16, 14, 12, and 10 pilot tones when the 256-tone plan comprises at least 3 direct current tones, at most one of 24, 22, 20, 18, 16, 15, 14, 12, 10, and 8 pilot tones when the 256-tone plan comprises at least 5 direct current tones, and at most one of 22, 20, 18, 16, 14, 13, 12, 10, and 8 pilot tones when the 256-tone plan comprises at least 7 direct current tones. The 512-tone plan includes one of 474, 476, and 480 data tones, at most one of 22, 20, and 16 pilot tones when the 512-tone plan comprises at least 5 direct current tones, and at most one of 16 and 14 pilot tones when the 512-tone plan comprises at least 11 direct current tones. The 1024-tone plan includes one of 948, 960, 972, 980, 984, 990, and 996 data tones, at most one of 60, 48, 36, 28, 24, 18, and 12 pilot tones when the 1024-tone plan comprises at least 5 direct current tones, and at most one of 54, 42, 30, 22, 18, and 12 pilot tones when the 1024-tone plan comprises at least 11 direct current tones. For example, the AP 104 can select from one of the tone plans discussed above with respect to FIGS. 12-16.

Upon selecting the 64-tone plan, at block 2020, the wireless device provides the message for transmission over a 5 MHz bandwidth. For example, the AP 104 can provide the message to the transmitter 210 for transmission over the antenna 216 according to the 64-tone plan. In various embodiments, the 64-tone plan can be applied to a 5 MHz system having a 4× symbol duration. In various embodiments, other bandwidths and/or symbol durations can be used.

Upon selecting the 128-tone plan, at block 2030, the wireless device provides the message for transmission over a 10 MHz bandwidth. For example, the AP 104 can provide the message to the transmitter 210 for transmission over the antenna 216 according to the 64-tone plan. In various embodiments, the 128-tone plan can be applied to a 10 MHz system having a 4× symbol duration. In various embodiments, other bandwidths and/or symbol durations can be used.

Upon selecting the 256-tone plan, at block 2040, the wireless device provides the message for transmission over a 20 MHz bandwidth. For example, the AP 104 can provide the message to the transmitter 210 for transmission over the antenna 216 according to the 64-tone plan. In various embodiments, the 256-tone plan can be applied to a 20 MHz system having a 4× symbol duration. In various embodiments, other bandwidths and/or symbol durations can be used.

Upon selecting the 512-tone plan, at block 2050, the wireless device provides the message for transmission over a 40 MHz bandwidth. For example, the AP 104 can provide the message to the transmitter 210 for transmission over the antenna 216 according to the 64-tone plan. In various embodiments, the 512-tone plan can be applied to a 40 MHz system having a 4× symbol duration. In various embodiments, other bandwidths and/or symbol durations can be used.

Upon selecting the 1024-tone plan, at block 2060, the wireless device provides the message for transmission over a 80 MHz bandwidth. For example, the AP 104 can provide the message to the transmitter 210 for transmission over the antenna 216 according to the 64-tone plan. In various embodiments, the 1024-tone plan can be applied to a 80 MHz system having a 4× symbol duration. In various embodiments, other bandwidths and/or symbol durations can be used.

In various embodiments, the method can further include interleaving encoded data, for example according to the 64-tone plan. The method can further include generating a series of interleaved bits for transmission based on the interleaved encoded data. Said interleaving can include using interleaved rotation indexes of at least one of 1 through 16 and a base subcarrier rotation of [0 2 1 3] for up to four spatial streams. Said interleaving can include using interleaved rotation indexes of at least one of 1 through 10 and a base subcarrier rotation of [0 4 2 6 1 5 3 7], or [0 5 2 7 3 6 1 4] for more than four spatial streams. Although a rotation index of [0 5 2 7 3 6 1 4] is used herein as one example of an index maximizing average subcarrier distance, any other rotation indexes that maximize (or increase) average subcarrier distance can be used. The method can further include transmitting the series of interleaved bits via the one or more spatial streams. For example, referring to FIG. 11, the interleaving system 1014 can generate a series of interleaved bits for one or more spatial streams. Interleaving for the one or more spatial streams can include using a 12 data tone block, using an interleaver depth according to FIGS. 12-16.

In various embodiments, the series of interleaved bits can be transmitted via the one or more spatial streams. For example, referring to FIG. 11, the series of interleaved bits can be transmitted using the transmission circuits 1110a-1110c and the antennas 1112a-1112c. In various embodiments, said interleaving can further include at least one of using an interleaver depth of 2 or 19 for a data tone block of 38, an interleaver depth of 2, 4, 5, 8, 10, or 20 for a data tone block of 40, an interleaver depth of 2, 3, 6, 7, 14, or 21 for a data tone block of 42, an interleaver depth of 2, 4, 11, or 22 for a data tone block of 44, an interleaver depth of 2 or 23 for a data tone block of 46, and an interleaver depth of 2, 3, 4, 6, 8, 12, 16, or 24 for a data tone block of 48.

In various embodiments, the method can further include interleaving encoded data, for example according to the 128-tone plan. The method can further include generating a series of interleaved bits for transmission based on the interleaved encoded data. Said interleaving can include using interleaved rotation indexes of at least one of 1 through 31 and a base subcarrier rotation of [0 2 1 3] for up to four spatial streams. Said interleaving can include using interleaved rotation indexes of at least one of 1 through 18 and a base subcarrier rotation of [0 4 2 6 1 5 3 7], or [0 5 2 7 3 6 1 4] for more than four spatial streams. Although a rotation index of [0 5 2 7 3 6 1 4] is used herein as one example of an index maximizing average subcarrier distance, any other rotation indexes that maximize (or increase) average subcarrier distance can be used. The method can further include transmitting the series of interleaved bits via the one or more spatial streams. For example, referring to FIG. 11, the interleaving system 1014 can generate a series of interleaved bits for one or more spatial streams. Interleaving for the one or more spatial streams can include using a 12 data tone block, using an interleaver depth according to FIGS. 12-16.

In various embodiments, the series of interleaved bits can be transmitted via the one or more spatial streams. For example, referring to FIG. 11, the series of interleaved bits can be transmitted using the transmission circuits 1110a-1110c and the antennas 1112a-1112c. In various embodiments, said interleaving can further include at least one of using an interleaver depth of 2, 3, 4, 6, 8, 12, 16, 24, 32, or 48 for a data tone block of 96, an interleaver depth of 2, 7, 14, or 49 for a data tone block of 98, an interleaver depth of 2, 4, 5, 10, 20, 25, or 50 for a data tone block of 100, an interleaver depth of 2, 3, 6, 17, 34, or 51 for a data tone block of 102, an interleaver depth of 2, 4, 8, 13, 26, or 52 for a data tone block of 104, and an interleaver depth of 2 or 53 for a data tone block of 106.

In various embodiments, the method can further include interleaving encoded data, for example according to the 256-tone plan. The method can further include generating a series of interleaved bits for transmission based on the interleaved encoded data. Said interleaving can include using interleaved rotation indexes of at least one of 50 through 62 and a base subcarrier rotation of [0 2 1 3] for up to four spatial streams. Said interleaving can include using interleaved rotation indexes of at least one of 1 through 33 and a base subcarrier rotation of [0 4 2 6 1 5 3 7], or [0 5 2 7 3 6 1 4] for more than four spatial streams. Although a rotation index of [0 5 2 7 3 6 1 4] is used herein as one example of an index maximizing average subcarrier distance, any other rotation indexes that maximize (or increase) average subcarrier distance can be used. The method can further include transmitting the series of interleaved bits via the one or more spatial streams. For example, referring to FIG. 11, the interleaving system 1014 can generate a series of interleaved bits for one or more spatial streams. Interleaving for the one or more spatial streams can include using a 12 data tone block, using an interleaver depth according to FIGS. 12-16.

In various embodiments, the series of interleaved bits can be transmitted via the one or more spatial streams. For example, referring to FIG. 11, the series of interleaved bits can be transmitted using the transmission circuits 1110a-1110c and the antennas 1112a-1112c. In various embodiments, said interleaving can further include at least one of using an interleaver depth of 2, 3, 4, 6, 8, 9, 12, 18, 24, 27, 36, 54, 72, or 108 for a data tone block of 216, an interleaver depth of 2 or 109 for a data tone block of 218, an interleaver depth of 2, 4, 5, 10, 11, 20, 22, 44, 55, or 110 for a data tone block of 220, an interleaver depth of 2, 3, 6, 37, 74, or 111 for a data tone block of 222, an interleaver depth of 2, 4, 7, 8, 14, 16, 28, 32, 56, or 112 for a data tone block of 224, an interleaver depth of 3, 5, 9, 15, 25, 45, or 75 for a data tone block of 225, an interleaver depth of 2 or 113 for a data tone block of 226, an interleaver depth of 2, 3, 4, 6, 12, 19, 38, 57, 76, or 114 for a data tone block of 228, an interleaver depth of 2, 5, 10, 23, 46, or 115 for a data tone block of 230, and an interleaver depth of 2, 4, 8, 29, 58, or 116 for a data tone block of 232.

In various embodiments, the method can further include interleaving encoded data, for example according to the 512-tone plan. The method can further include generating a series of interleaved bits for transmission based on the interleaved encoded data. Said interleaving can include using interleaved rotation indexes of at least one of 113 through 127 and a base subcarrier rotation of [0 2 1 3] for up to four spatial streams. Said interleaving can include using interleaved rotation indexes of at least one of 54 through 66 and a base subcarrier rotation of [0 4 2 6 1 5 3 7], or [0 5 2 7 3 6 1 4] for more than four spatial streams. Although a rotation index of [0 5 2 7 3 6 1 4] is used herein as one example of an index maximizing average subcarrier distance, any other rotation indexes that maximize (or increase) average subcarrier distance can be used. The method can further include transmitting the series of interleaved bits via the one or more spatial streams. For example, referring to FIG. 11, the interleaving system 1014 can generate a series of interleaved bits for one or more spatial streams. Interleaving for the one or more spatial streams can include using a 12 data tone block, using an interleaver depth according to FIGS. 12-16.

In various embodiments, the series of interleaved bits can be transmitted via the one or more spatial streams. For example, referring to FIG. 11, the series of interleaved bits can be transmitted using the transmission circuits 1110a-1110c and the antennas 1112a-1112c. In various embodiments, said interleaving can further include at least one of using an interleaver depth of 2, 3, 6, 79, 158, or 237 for a data tone block of 474, an interleaver depth of 2, 4, 7, 14, 17, 28, 34, 68, 119, or 238 for a data tone block of 476, and an interleaver depth of 2, 3, 4, 5, 6, 8, 10, 12, 15, 16, 20, 24, 30, 32, 40, 48, 60, 80, 96, 120, 160, or 240 for a data tone block of 480.

In various embodiments, the method can further include interleaving encoded data, for example according to the 1024-tone plan. The method can further include generating a series of interleaved bits for transmission based on the interleaved encoded data. Said interleaving can include using interleaved rotation indexes of at least one of 232 through 254 and a base subcarrier rotation of [0 2 1 3] for up to four spatial streams. Said interleaving can include using interleaved rotation indexes of at least one of 113 through 130 and a base subcarrier rotation of [0 4 2 6 1 5 3 7], or [0 5 2 7 3 6 1 4] for more than four spatial streams. Although a rotation index of [0 5 2 7 3 6 1 4] is used herein as one example of an index maximizing average subcarrier distance, any other rotation indexes that maximize (or increase) average subcarrier distance can be used. The method can further include transmitting the series of interleaved bits via the one or more spatial streams. For example, referring to FIG. 11, the interleaving system 1014 can generate a series of interleaved bits for one or more spatial streams. Interleaving for the one or more spatial streams can include using a 12 data tone block, using an interleaver depth according to FIGS. 12-16.

In various embodiments, the series of interleaved bits can be transmitted via the one or more spatial streams. For example, referring to FIG. 11, the series of interleaved bits can be transmitted using the transmission circuits 1110a-1110c and the antennas 1112a-1112c. In various embodiments, said interleaving can further include at least one of using an interleaver depth of 2, 3, 4, 6, 12, 79, 158, 237, 316, or 474 for a data tone block of 948, an interleaver depth of 2, 3, 4, 5, 6, 8, 10, 12, 15, 16, 20, 24, 30, 32, 40, 48, 60, 64, 80, 96, 120, 160, 192, 240, 320, or 480 for a data tone block of 960, an interleaver depth of 2, 3, 4, 6, 9, 12, 18, 27, 36, 54, 81, 108, 162, 243, 324, or 486 for a data tone block of 972, an interleaver depth of 2, 4, 5, 7, 10, 14, 20, 28, 35, 49, 70, 98, 140, 196, 245, or 490 for a data tone block of 980, an interleaver depth of 2, 3, 4, 6, 8, 12, 24, 41, 82, 123, 164, 246, 328, or 492 for a data tone block of 984, an interleaver depth of 2, 3, 5, 6, 9, 10, 11, 15, 18, 22, 30, 33, 45, 55, 66, 90, 99, 110, 165, 198, 330, or 495 for a data tone block of 990, and an interleaver depth of 2, 3, 4, 6, 12, 83, 166, 249, 332, or 498 for a data tone block of 996.

In an embodiment, the method shown in FIG. 11 can be implemented in a wireless device that can include a selecting circuit, a providing circuit, and a interleaving circuit. Those skilled in the art will appreciate that a wireless device can have more components than the simplified wireless device described herein. The wireless device described herein includes only those components useful for describing some prominent features of implementations within the scope of the claims.

The selecting circuit can be configured to selecting the tone plan for wireless communication of the message. In an embodiment, the selecting circuit can be configured to implement block 2010 of the flowchart 2000 (FIG. 20). The selecting circuit can include one or more of the DSP 220 (FIG. 2), the processor 204 (FIG. 2), and the memory 206 (FIG. 2). In some implementations, means for selecting can include the selecting circuit.

The providing circuit can be configured to provide the message for transmission according to the selected tone plan. In an embodiment, the providing circuit can be configured to implement any of blocks 2020-2060 of the flowchart 2000 (FIG. 20). The providing circuit can include one or more of the transmitter 210 (FIG. 2), the transceiver 214 (FIG. 2), the processor 204 (FIG. 2), the DSP 220 (FIG. 2), and the memory 206 (FIG. 2). In some implementations, the means for providing can include the providing circuit.

The interleaving circuit can be configured to interleave data for transmission. The interleaving circuit can include one or more of the interleaving system 1014 (FIG. 10), the stream parser 1106 (FIG. 11), any of the interleavers 1108A-1108C (FIG. 11), the processor 204 (FIG. 2), the DSP 220 (FIG. 2), and the memory 206 (FIG. 2). In some implementations, means for interleaving can include the interleaving circuit.

In various embodiments, the 64-tone plan (or any other size tone plan) can advantageously include 48 data tones, and 4 pilot tones in a 52-tone RU. In various embodiments, the 128-tone plan (or any other size tone plan) can advantageously include 102 data tones, and 4 pilot tones in a 106-tone RU. In various embodiments, this configuration, discussed below with respect to FIG. 21 can provide several advantages over other tone plans discussed herein.

Figure 21:
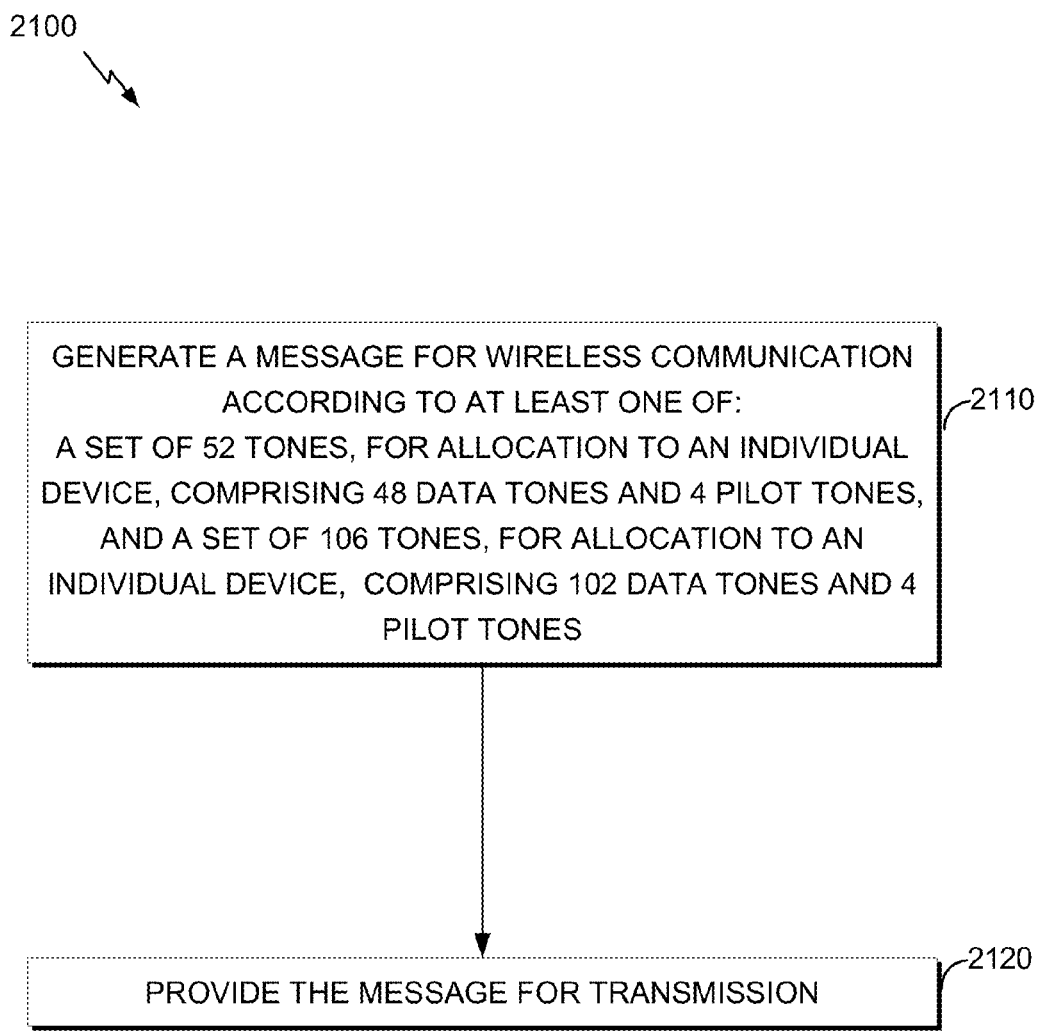
FIG. 21 shows a flowchart for another exemplary method of wireless communication that can be employed within the wireless communication system of FIG. 1.

FIG. 21 shows a flowchart 2100 for an exemplary method of wireless communication that can be employed within the wireless communication system 100 of FIG. 1. The method can be implemented in whole or in part by the devices described herein, such as the AP 104 (FIG. 1), any of the STAs 106A-106D (FIG. 1), the wireless device 202 shown in FIG. 2, and/or the devices 1010, 1020, 1030, or 1040 (FIG. 10). Although the illustrated method is described herein with reference to the wireless communication system 100 discussed above with respect to FIG. 1, the wireless device 202 discussed above with respect to FIG. 2, the system 1000 of FIG. 10, and the tone plans of FIGS. 3-9 and 12-19, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 2110, a wireless device generates a message for wireless communication according to at least one of a 64-tone plan and a 128-tone plan. The 64-tone plan includes 48 data tones and 4 pilot tones. The 128-tone plan includes 102 data tones and 4 pilot tones. For example, the wireless device can generate a message according to the 64- or 128-tone plan, discussed above with respect to FIGS. 3-9 and 12-19.

In various embodiments, generating the message according to the 64- or 128-tone plan can include one or more of: encoding a plurality of data bits, parsing the stream of encoded bits, interleaving the encoded bits, mapping the data bits to a specified number of OFDM data tones, mapping a pilot sequence of bits to a specified number of pilot OFDM tones, and mapping null data bits to a specified number of left guard tones, right guard tones, and DC tones. For example, the encoder 1104 (FIG. 11) can encode the data bits. The stream parser 1106 (FIG. 11) can parse the encoded data bits. The interleavers 1108a-1108c (FIG. 11) interleave the parsed data. For the 64-tone plan, the modulators 1102a-1102c (FIG. 11) can map the data bits to 48 OFDM data tones, map a pilot sequence of bits to 4 pilot OFDM tones, and map null data bits to 12 leftover tones for use as guard and DC tones. For the 128-tone plan, the modulators 1102a-1108c (FIG. 11) can map the data bits to 102 OFDM data tones, map a pilot sequence of bits to 4 pilot OFDM tones, and map null data bits to 22 leftover tones for use as guard and DC tones.

Next, at block 2120, the wireless device provides the message for transmission. For example, the AP 104 can provide the message to the transmitter 210 for transmission over the antenna 216.

In various embodiments, providing the message for transmission can include one or more of: encoding a plurality of data bits, parsing the stream of encoded bits, interleaving the encoded bits, mapping the data bits to a specified number of OFDM data tones, mapping a pilot sequence of bits to a specified number of pilot OFDM tones, and mapping null data bits to a specified number of left guard tones, right guard tones, and DC tones. For example, the processor 204 (FIG. 2) can organize a plurality of data bits according to the 1024-tone plan. The encoder 1104 (FIG. 11) can encode the data bits. The stream parser 1106 (FIG. 11) can parse the encoded data bits. The interleavers 1108a-1108c (FIG. 11) interleave the parsed data. The modulators 1102a-1102c (FIG. 11) can modulate the interleaved data for transmission via the transmitters 1110a-1110c (FIG. 11).

In various embodiments, the method can further include interleaving encoded data, for the message generated according to the set of 52 tones, using an interleaver depth of 16 and a base subcarrier rotation of 11. In various embodiments, the method can further include interleaving encoded data, for the message generated according to the set of 52 tones, using a number of interleaver rows equal to three times a number of coded bits per single subcarrier for each spatial stream used to transmit the message. In various embodiments, the method can further include interleaving encoded data, for the message generated according to the set of 106 tones, using an interleaver depth of 17 and a base subcarrier rotation of 29. In various embodiments, the method can further include interleaving encoded data, for the message generated according to the set of 106 tones, using a number of interleaver rows equal to six times a number of coded bits per single subcarrier for each spatial stream used to transmit the message.

In various embodiments, the method can further include mapping tones of the message, for the message generated according to the set of 52 tones, using a low density parity check (LDPC) tone mapping distance (DTM) of 3. In various embodiments, the method can further include mapping tones of the message, for the message generated according to the set of 106 tones, using a low density parity check (LDPC) tone mapping distance (DTM) of 6. In various embodiments, the method can further include providing the message for transmission over no more than four spatial streams when using binary convolutional code interleaving.

In some embodiments, the process of tone mapping can include associating constellation points of encoded data bits with OFDM subcarriers. The OFDM subcarriers to which each tone is mapped can be separated by the indicated number of subcarriers. For example, such mapping can include encoding a plurality of data bits, and mapping those encoded bits to quadrature amplitude modulation (QAM) symbols. Mapping can further include mapping the 1st QAM symbol to the 1st data tone, the 2nd QAM symbol to the (1+DTM)-th data tone, the 3rd QAM symbol to the (1+2*DTM)-th data tone, and so on. Mappings can wrap around such that, for example, the 49th QAM symbol is mapped to the 960-th data tone, and the 50th QAM symbol is mapped to the 2nd data tone, the 51-st QAM symbol is mapped to the (2+D_TM)-th data tone, and so on.

In various embodiments, the method can be performed on a mobile station such as, for example, a STA 106A-106D of FIG. 1. Providing the message for transmission can include transmitting the message through a transmitter (for example, the transmitter 210 of FIG. 2) and an antenna (for example, the antenna 216 of FIG. 2) of the mobile station to an access point (for example, the AP 104 of FIG. 1) serving the mobile station. In various embodiments, the method can be performed on an access point such as, for example, the AP 104 of FIG. 1. Providing the message for transmission can include transmitting the message through a transmitter (for example, the transmitter 210 of FIG. 2) and an antenna (for example, the antenna 216 of FIG. 2) of the access point to a mobile station (for example, the STA 106A of FIG. 1) served by the access point.

In various embodiments, the method of FIG. 21 can include one or more blocks shown in the method of FIG. 20. For example, the method can include selecting from one of the 64-, 128-, 256-, 512-, and 1024-tone plans as discussed above with respect to block 2010 of FIG. 20. The 256-, 512-, and 1024-tone plans can have any of the characteristics discussed above with respect to FIGS. 3-9 and 12-19.

In an embodiment, the method shown in FIG. 21 can be implemented in a wireless device that can include a generating circuit and a providing circuit. Those skilled in the art will appreciate that a wireless device can have more components than the simplified wireless device described herein. The wireless device described herein includes only those components useful for describing some prominent features of implementations within the scope of the claims.

The generating circuit can be configured to generate the message according to the 64- or 128-tone plans. In an embodiment, the generating circuit can be configured to implement block 2110 of the flowchart 2100 (FIG. 21). The generating circuit can include one or more of the DSP 220 (FIG. 2), the processor 204 (FIG. 2), and the memory 206 (FIG. 2). In some implementations, means for generating can include the generating circuit.

The providing circuit can be configured to provide the message for transmission. In an embodiment, the providing circuit can be configured to implement block 2120 of the flowchart 2100 (FIG. 21). The providing circuit can include one or more of the transmitter 210 (FIG. 2), the transceiver 214 (FIG. 2), the processor 204 (FIG. 2), the DSP 220 (FIG. 2), the antenna 216 (FIG. 2), and the memory 206 (FIG. 2). In some implementations, means for providing can include the providing circuit.

In various embodiments, the wireless device can further include a mapping circuit. The mapping circuit can be configured to map tones of the message using a low density parity check (LDPC) tone mapping distance (DTM). In various embodiments, the DTM can be one of 3 or 6. The mapping circuit can include one or more of the DSP 220 (FIG. 2), the processor 204 (FIG. 2), the memory 206 (FIG. 2), the interleaving system 1014 (FIG. 10), the interleavers 1108a-1108c (FIG. 11), and the modulators 1102a-1102c (FIG. 11). In some implementations, means for mapping can include the generating circuit.

In various embodiments, the wireless device can further include a transmitting circuit. The transmitting circuit can be configured to transmit the message, for example through a transmitter and an antenna of a mobile station or access point. The transmitting circuit can include one or more of the transmitter 210 (FIG. 2), the transceiver 214 (FIG. 2), the processor 204 (FIG. 2), the DSP 220 (FIG. 2), the antenna 216 (FIG. 2), and the memory 206 (FIG. 2). In some implementations, means for transmitting can include the transmitting circuit.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can comprise non-transitory computer readable medium (e.g., tangible media). In addition, in some aspects computer readable medium can comprise transitory computer readable medium (e.g., a signal). Combinations of the above should also be included within the scope of computer-readable media.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. An apparatus configured to perform wireless communication, comprising:
    a memory that stores instructions; and
    a processor coupled with the memory and configured to execute the instructions to:
        generate a message for wireless communication according to a set of 52 tones, for allocation to an individual device, comprising 48 data tones and 4 pilot tones; and
        map tones of the message, for the message generated according to the set of 52 tones, using a low density parity check (LDPC) tone mapping distance (DTM) of 3; and
        outputting the message for wireless transmission.

2. The apparatus of claim 1, wherein the processor is further configured to execute the instructions to interleave encoded data, for the message generated according to the set of 52 tones, using an interleaver depth of 16 and a base subcarrier rotation of 11.

3. The apparatus of claim 1, wherein the processor is further configured to execute the instructions to interleave encoded data, for the message generated according to the set of 52 tones, using a number of interleaver rows equal to three times a number of coded bits per single subcarrier for each spatial stream used to transmit the message.

4. The apparatus of claim 1, wherein the apparatus is an access point, and wherein the processor is configured to provide the message for transmission by being configured to transmit the message through a transmitter and an antenna of the access point to a mobile station served by the access point.

5. The apparatus of claim 1, wherein the processor is further configured to:
    generate a message for wireless communication according to a set of 106 tones, for allocation to an individual device, comprising 102 data tones and 4 pilot tones; and
    execute the instructions to interleave encoded data, for the message generated according to the set of 106 tones, using an interleaver depth of 17 and a base subcarrier rotation of 29.

6. The apparatus of claim 1, wherein the processor is further configured to:
    generate a message for wireless communication according to a set of 106 tones, for allocation to an individual device, comprising 102 data tones and 4 pilot tones; and
    execute the instructions to interleave encoded data, for the message generated according to the set of 106 tones, using a number of interleaver rows equal to six times a number of coded bits per single subcarrier for each spatial stream used to transmit the message.

7. The apparatus of claim 1, wherein the processor is further configured to:
    generate a message for wireless communication according to a set of 106 tones, for allocation to an individual device, comprising 102 data tones and 4 pilot tones; and
    execute the instructions to map tones of the message, for the message generated according to the set of 106 tones, using a low density parity check (LDPC) tone mapping distance (DTM) of 6.

8. The apparatus of claim 1, wherein the processor is configured to provide the message for transmission over no more than four spatial streams when using binary convolutional code interleaving.

9. The apparatus of claim 1, wherein the apparatus is a mobile station, and wherein the processor is configured to provide the message for transmission by being configured to transmit the message through a transmitter and an antenna of the mobile station to an access point serving the mobile station.

10. A method of wireless communication, comprising:
    generating a message for wireless communication according to a set of 52 tones, for allocation to an individual device, comprising 48 data tones and 4 pilot tones; and
    mapping tones of the message, for the message generated according to the set of 52 tones, using a low density parity check (LDPC) tone mapping distance (DTM) of 3; and
    outputting the message for wireless transmission.

11. The method of claim 10, wherein the method is performed on an access point, and wherein providing the message for transmission comprises transmitting the message through a transmitter and an antenna of the access point to a mobile station served by the access point.

12. The method of claim 10, wherein generating the message comprises generating the message according to the set of 52 tones, the method further comprising interleaving encoded data, for the message generated according to the set of 52 tones, using an interleaver depth of 16 and a base subcarrier rotation of 11.

13. The method of claim 10, wherein generating the message comprises generating the message according to the set of 52 tones, the method further comprising interleaving encoded data, for the message generated according to the set of 52 tones, using a number of interleaver rows equal to three times a number of coded bits per single subcarrier for each spatial stream used to transmit the message.

14. The method of claim 10, wherein the method is performed on a mobile station, and wherein providing the message for transmission comprises transmitting the message through a transmitter and an antenna of the mobile station to an access point serving the mobile station.

15. The method of claim 10, further comprising:
generating a message for wireless communication according to a set of 106 tones, for allocation to an individual device, comprising 102 data tones and 4 pilot tones; and
interleaving encoded data, for the message generated according to the set of 106 tones, using an interleaver depth of 17 and a base subcarrier rotation of 29.

16. The method of claim 10, further comprising:
generating a message for wireless communication according to a set of 106 tones, for allocation to an individual device, comprising 102 data tones and 4 pilot tones; and
interleaving encoded data, for the message generated according to the set of 106 tones, using a number of interleaver rows equal to six times a number of coded bits per single subcarrier for each spatial stream used to transmit the message.

17. The method of claim 10, further comprising:
generating a message for wireless communication according to a set of 106 tones, for allocation to an individual device, comprising 102 data tones and 4 pilot tones; and
mapping tones of the message, for the message generated according to the set of 106 tones, using a low density parity check (LDPC) tone mapping distance (DTM) of 6.

18. The method of claim 10, further comprising providing the message for transmission over no more than four spatial streams when using binary convolutional code interleaving.

19. An apparatus for wireless communication, comprising:
means for generating a message for wireless communication according to a set of 52 tones, for allocation to an individual device, comprising 48 data tones and 4 pilot tones;
means for mapping tones of the message, for the message generated according to the set of 52 tones, using a low density parity check (LDPC) tone means for mapping distance (DTM) of 3; and
means for outputting the message for wireless transmission.

20. The apparatus of claim 19, further comprising:
generating a message for wireless communication according to a set of 106 tones, for allocation to an individual device, comprising 102 data tones and 4 pilot tones; and
means for mapping tones of the message, for the message generated according to the set of 106 tones, using a low density parity check (LDPC) tone means for mapping distance (DTM) of 6.

21. The apparatus of claim 19, further comprising means for providing the message for transmission over no more than four spatial streams when using binary convolutional code interleaving.

22. The apparatus of claim 19, further comprising means for interleaving encoded data, for the message generated according to the set of 52 tones, using an interleaver depth of 16 and a base subcarrier rotation of 11.

23. The apparatus of claim 19, further comprising means for interleaving encoded data, for the message generated according to the set of 52 tones, using a number of interleaver rows equal to three times a number of coded bits per single subcarrier for each spatial stream used to transmit the message.

24. The apparatus of claim 19, wherein the apparatus comprises a mobile station, and wherein the means for providing the message for transmission comprises means for transmitting the message through a transmitter and an antenna of the mobile station to an access point serving the mobile station.

25. The apparatus of claim 19, further comprising:
means for generating a message for wireless communication according to a set of 106 tones, for allocation to an individual device, comprising 102 data tones and 4 pilot tones; and
means for interleaving encoded data, for the message generated according to the set of 106 tones, using an interleaver depth of 17 and a base subcarrier rotation of 29.

26. The apparatus of claim 19, further comprising
means for generating a message for wireless communication according to a set of 106 tones, for allocation to an individual device, comprising 102 data tones and 4 pilot tones; and
means for interleaving encoded data, for the message generated according to the set of 106 tones, using a number of interleaver rows equal to six times a number of coded bits per single subcarrier for each spatial stream used to transmit the message.

27. A non-transitory computer-readable medium comprising instructions that, when executed, cause an apparatus to:
generate a message for wireless communication according to a set of 52 tones, for allocation to an individual device, comprising 48 data tones and 4 pilot tones;
map tones of the message using a low density parity check (LDPC) tone mapping distance (DTM) of 3; and
outputting the message for wireless transmission.

* * * * *